(12) United States Patent
Uchimura et al.

(10) Patent No.: US 11,667,503 B2
(45) Date of Patent: *Jun. 6, 2023

(54) VEHICLE-MOUNTED DEVICE, CARGO HANDLING MACHINE, CONTROL CIRCUIT, CONTROL METHOD, AND PROGRAM THEREOF

(71) Applicant: NEC CORPORATION, Tokyo (JP)

(72) Inventors: Jun Uchimura, Tokyo (JP); Hideaki Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 669 days.

This patent is subject to a terminal disclaimer.

(21) Appl. No.: 16/495,005

(22) PCT Filed: Feb. 28, 2018

(86) PCT No.: PCT/JP2018/007496
§ 371 (c)(1),
(2) Date: Sep. 17, 2019

(87) PCT Pub. No.: WO2018/173667
PCT Pub. Date: Sep. 27, 2018

(65) Prior Publication Data
US 2020/0031642 A1  Jan. 30, 2020

(30) Foreign Application Priority Data

Mar. 22, 2017  (JP) .............................. JP2017-056109

(51) Int. Cl.
*B66F 9/075* (2006.01)
*G01S 17/06* (2006.01)
(Continued)

(52) U.S. Cl.
CPC .............. *B66F 9/0755* (2013.01); *B60Q 9/00* (2013.01); *B62D 15/029* (2013.01); *G01S 17/06* (2013.01);
(Continued)

(58) Field of Classification Search
CPC ....... B66F 9/0755; B60Q 9/00; B62D 15/029; G01S 17/06; G01S 17/89
(Continued)

(56) References Cited

U.S. PATENT DOCUMENTS 5,174,415 A * 12/1992 Neagle ...................... B66F 9/06
180/209
5,482,141 A * 1/1996 Wilson ....................... B66F 9/06
280/401

(Continued)

FOREIGN PATENT DOCUMENTS

CN  204372136 U  *  6/2015
EP     2181944 A1     5/2010
(Continued)

OTHER PUBLICATIONS

Heqing et al., "Research on Fault Diagnosis of Fork Lift Truck Hydraulic System Based on Artificial Neural Network," 2009, vol. 1, Publisher: IEEE.*

(Continued)

*Primary Examiner* — Tuan C To

(57) ABSTRACT

A vehicle-mounted device includes an analysis unit and a control unit. The analysis unit detects an insertion target into which an insertion blade is inserted, on the basis of sensing information acquired from a spatial recognition device. The control unit performs a facing determination to determine whether or not the insertion blade faces an insertion surface having an insertion portion of the insertion target on the basis of the sensing information.

10 Claims, 18 Drawing Sheets

(51) Int. Cl.
*G01S 17/89* (2020.01)
*B60Q 9/00* (2006.01)
*B62D 15/02* (2006.01)
*G05D 1/00* (2006.01)

(52) U.S. Cl.
CPC ............ *G01S 17/89* (2013.01); *G05D 1/0094* (2013.01); *G05D 2201/0216* (2013.01)

(58) Field of Classification Search
USPC .......................................................... 701/50
See application file for complete search history.

(56) References Cited

U.S. PATENT DOCUMENTS

| | | | | |
|---|---|---|---|---|
| 5,748,097 | A * | 5/1998 | Collins | E02F 3/32 340/685 |
| 5,749,696 | A * | 5/1998 | Johnson | B66F 9/0755 414/281 |
| 5,938,710 | A * | 8/1999 | Lanza | G05D 1/0246 701/28 |
| 5,986,560 | A * | 11/1999 | Rayburn | G01G 19/083 177/136 |
| 6,089,354 | A * | 7/2000 | Hettegger | B66F 9/10 187/244 |
| 6,296,081 | B1 * | 10/2001 | Nagai | F15B 15/2884 187/394 |
| 7,568,547 | B2 * | 8/2009 | Yamada | B66F 9/07572 180/282 |
| 10,435,284 | B1 * | 10/2019 | Androus | B66F 9/24 |
| 2003/0156934 | A1 * | 8/2003 | Fujita | B66F 17/003 414/618 |
| 2004/0083025 | A1 | 4/2004 | Yamanouchi | B66F 9/0755 700/213 |
| 2004/0098146 | A1 * | 5/2004 | Katae | B66F 9/24 340/429 |
| 2006/0175134 | A1 * | 8/2006 | Schonauer | B66F 9/18 187/237 |
| 2008/0011554 | A1 * | 1/2008 | Broesel | B66F 9/0755 187/224 |
| 2011/0234389 | A1 * | 9/2011 | Mellin | B66F 9/0755 340/435 |
| 2014/0159881 | A1 * | 6/2014 | Adami | B66F 9/07504 414/281 |
| 2016/0083233 | A1 * | 3/2016 | Yamada | B66F 17/003 414/664 |
| 2016/0090283 | A1 | 3/2016 | Svensson et al. | |
| 2016/0090285 | A1 * | 3/2016 | Svensson | B66F 9/24 700/300 |
| 2017/0015537 | A1 * | 1/2017 | Bosworth, III | B66F 9/0755 |
| 2018/0081369 | A1 * | 3/2018 | Fischer | G01S 17/08 |
| 2020/0377351 | A1 * | 12/2020 | Uchimura | B66F 9/0755 |

FOREIGN PATENT DOCUMENTS

| | | | |
|---|---|---|---|
| EP | 3000771 A1 * | 3/2016 | ............ B66F 9/0755 |
| EP | 3000773 A1 * | 3/2016 | ............ B66F 9/0755 |
| JP | S59-116399 U | 8/1984 | |
| JP | 2-079398 U | 6/1990 | |
| JP | H08-301596 A | 11/1996 | |
| JP | 09-175798 A | 7/1997 | |
| JP | 11-278799 A | 10/1999 | |
| JP | 11-322294 A | 11/1999 | |
| JP | 2000-335695 A | 12/2000 | |
| JP | 2003-034496 A | 2/2003 | |
| JP | 2003-128395 A | 5/2003 | |
| JP | 2005-089013 A | 4/2005 | |
| JP | 2006-528122 A | 12/2006 | |
| JP | 2008-290811 A | 12/2008 | |
| JP | 2013-086959 A | 5/2013 | |
| JP | 2013-230903 A | 11/2013 | |
| JP | 2015101113 A * | 6/2015 | |
| JP | 2016-204067 A | 12/2016 | |
| JP | 2017-019596 A | 1/2017 | |
| JP | 2017019596 A * | 1/2017 | |
| JP | 2013-230903 A | 11/2018 | |
| KR | 10-2011-0027460 A | 3/2011 | |
| KR | 1600980 B1 * | 3/2016 | ............ B66F 17/003 |
| WO | WO-2005054111 A1 * | 6/2005 | ............ B66F 9/0755 |
| WO | 2006/070463 A1 | 7/2006 | |
| WO | 2016/070463 A1 | 7/2006 | |
| WO | 2016/181733 A1 | 11/2016 | |

OTHER PUBLICATIONS

M. Bergamasco et al., "Fork-Lift Truck Simulator for Training in Industrial Environment," 2005, vol. 1; Publisher: IEEE.*
International Search Report for PCT/JP2018/007496, dated May 22, 2018.
U.S. Office Action for U.S. Appl. No. 16/491,942 dated Mar. 16, 2022.
International Search Report for PCT/JP2018/007670 dated May 22, 2018 (PCT/ISA/210).
Japanese Office Action for JP Application No. 2017-056011 dated Apr. 6, 2021 with English Translation.
JP Office Action for JP Application No. 2021-179753, dated Oct. 4, 2022 with English Translation.
JP Office Action for JP Application No. 2021-179753, dated Mar. 22, 2023 with English Translation.

* cited by examiner

VEHICLE-MOUNTED DEVICE, CARGO HANDLING MACHINE, CONTROL CIRCUIT, CONTROL METHOD, AND PROGRAM THEREOF

CROSS REFERENCE TO RELATED APPLICATIONS

This application is a National Stage of International Application No. PCT/JP2018/007496 filed Feb. 28, 2018, claiming priority based on Japanese Patent Application No. 2017-056109 filed Mar. 22, 2017, the contents of which are incorporated herein by reference.

TECHNICAL FIELD

The present invention relates to a vehicle-mounted device, a cargo handling machine, a control circuit, a control method, and a program thereof.

BACKGROUND ART

In recent years, with the development of automatic driving technology and robot technology, the accuracy of spatial recognition technology utilizing a laser or a radar has been improved, and the prices of spatial recognition sensors has reduced. On the other hand, a device that manages cargo handling work is used in a cargo handling machine such as a forklift.

For example, Patent Document 1 describes that when a radio frequency identifier (RFID) tag in two rows in the same column is detected, a determination is made that a forklift is in a state in which the forklift faces a rack.

Patent Document 2 describes a configuration in which a notification device that notifies a driver of information on the amount of fork insertion into a pallet on the basis of a detection signal of a proximity sensor is provided.

Patent Document 3 describes that when cargo or a pallet that is an unloading target is included in distance data measured by a laser sensor, trajectory data for movement of a vehicle body to an unloading position of the cargo or the pallet is generated from the distance data, and a command is given to a control unit using the generated trajectory data.

DOCUMENTS OF THE PRIOR ART

Patent Document

[Patent Document 1] Published Japanese Translation No. 2006-070463 of the PCT International Publication
[Patent Document 2] Japanese Unexamined Patent Application, First Publication No. H09-175798
[Patent Document 3] Japanese Unexamined Patent Application, First Publication No. 2016-204067

SUMMARY OF INVENTION

Problems to be Solved by the Invention

However, for example, the technologies described in Patent Documents 1 and 2 are technologies using an RFID (a proximity sensor). Therefore, in the technologies described in Patent Documents 1 and 2, there is a problem that accuracy cannot be obtained and the fork of a forklift cannot appropriately grip when only the RFID is used.

Further, for example, the technology described in Patent Documents 3 is a technology for generating the trajectory data as a result of measurement and moving the vehicle body. Therefore, in the technology described in Patent Document 3, there is a problem that a transport target cannot be appropriately gripped when the movement is not performed as in the trajectory data as a result of the movement.

Further, for example, in the technologies described in Patent Documents 1 to 3, pulling out the fork after transport is not considered.

As described above, with the technologies described in Patent Documents 1 to 3, the transport target cannot be appropriately transported in some cases.

Therefore, an object of the present invention is to provide a vehicle-mounted device, a cargo handling machine, a control circuit, a control method, and a program capable of appropriately transporting a transport target.

Means for Solving the Problems

An aspect of the present invention has been made to solve the above-described problem and is a vehicle-mounted device including: an analysis unit that detects an insertion target into which an insertion blade is to be inserted, on the basis of sensing information acquired from a spatial recognition device; and a control unit that performs a facing determination to determine whether or not the insertion blade is facing an insertion surface having an insertion portion of the insertion target on the basis of the sensing information.

Another aspect of the present invention is a cargo handling machine including the above-described vehicle-mounted device.

Still another aspect of the present invention is a control circuit that determines whether or not an insertion blade faces an insertion surface having an insertion portion of an insertion target into which the insertion blade is inserted, on the basis of sensing information acquired from a spatial recognition device.

Still another aspect of the present invention is a control method including: detecting, by an analysis unit, an insertion target into which an insertion blade is inserted, on the basis of sensing information acquired from a spatial recognition device; and performing, by a control unit, a facing determination to determine whether or not the insertion blade faces an insertion surface having an insertion portion of the insertion target on the basis of the sensing information.

Still another aspect of the present invention is a program causing a computer to: detect an insertion target into which an insertion blade is inserted, on the basis of sensing information acquired from a spatial recognition device; and perform a facing determination to determine whether or not the insertion blade faces an insertion surface having an insertion portion of the insertion target on the basis of the sensing information.

Advantageous Effects of the Invention

According to the aspects of the present invention, it is possible to appropriately transport the transport target.

EMBODIMENTS FOR CARRYING OUT THE INVENTION

Figure 1:
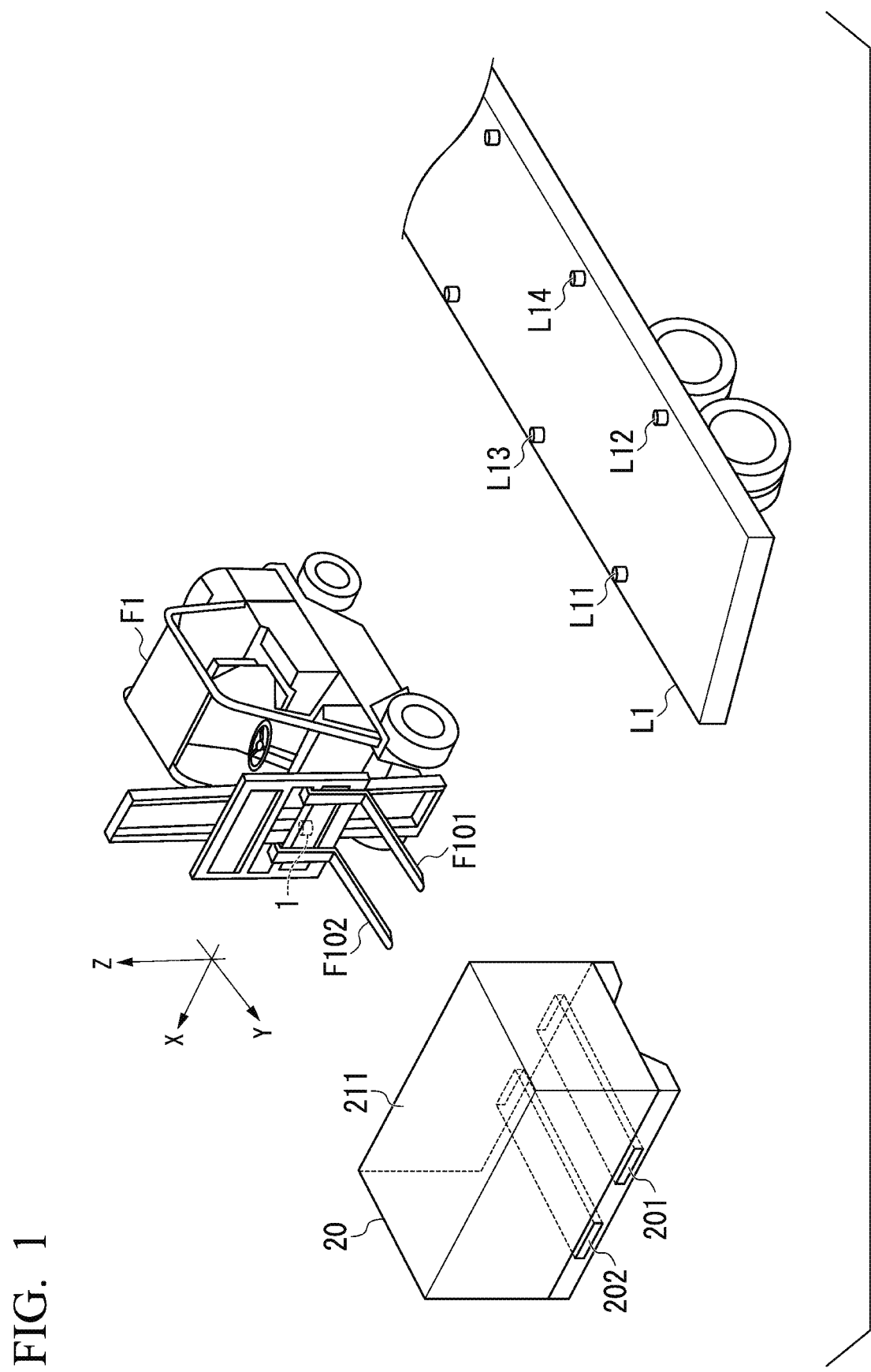
FIG. 1 is a perspective view illustrating transport work according to an embodiment of the present invention.

Hereinafter, embodiments of the present invention will be described in detail with reference to the drawings.
<Transport Work>
FIG. 1 is an illustrative diagram illustrating transport work according to an embodiment of the present invention. A forklift F1 is an example of a cargo handling machine.

Forks F101 and F102 are provided to the forklift F1. The forks F101 and F102 are examples of insertion blades.

The forklift F1 grips and transports a transport target such as a load or a pallet by inserting the forks F101 and F102 into the transport target. That is, the insertion blade that grips the transport target by being inserted into the transport target is provided in the cargo handling machine.

A container 20 is an example of the transport target or an insertion target. The container 20 is a container for storing cargo or the like therein. Fork pockets 201 and 202 are provided in the container 20. The fork pockets 201 and 202 are holes or concave portions into which the forks F101 and F102 are inserted, respectively. The fork pockets 201 and 202 are an example of insertion targets.

A surface facing the forklift F1 (also referred to as an "insertion surface 211") at the time of the insertion or the transport has openings (insertion portions, which may be recesses) of the fork pockets 201 and 202. The fork pockets 201 and 202 are holes or concave portions in which the forks F101 and F102 are inserted from a front surface (an insert surface 211) to a back surface (a positive direction of a Y axis in FIG. 1) of the transport target, and that have distal end portions projecting from a back surface.

In FIG. 1, the fork pockets 201 and 202 are holes extending in a straight line in a normal direction of the insertion surface 211 in a lower portion of the insertion surface 211.

When the forks F101 and F102 are inserted straight into the fork pockets 201 and 202, respectively, the forklift F1 can grip the container 20 appropriately (with a good balance and stability) and transport the container 20.

It should be noted that dimensions or the like of the container 20 or the fork pockets 201 and 202 are defined by standards (for example, JIS). Further, the transport target is not limited to the container 20, may be a pallet, or may be both of a pallet and cargo placed on a pallet. Here, the pallet refers to a cargo handling platform for loading the cargo. The fork pockets are provided in the pallet. Further, there may be three or more (for example, four) fork pockets.

A work management device 1 is attached and fixed to a cargo handling machine. The work management device 1 includes, for example, a spatial recognition sensor such as a laser sensor. A case in which the spatial recognition sensor is a laser sensor will be described in the embodiment. That is, the work management device 1 (a spatial recognition sensor) radiates laser light, receives reflected light, and senses a distance R from the work management device 1 to each object. The work management device 1 repeats this for a range of a sensing target. The work management device 1 recognizes a space, for example, according to an irradiation direction of the laser light and the distance R to each object (see FIGS. 3 to 6).

The work management device 1 detects the container 20 (or the insertion surface 211) on the basis of sensing information obtained from the spatial recognition sensor. The work management device 1 performs a facing determination to determine whether or not the forklift F1 faces the insertion surface 211 having the fork pockets 201 and 202 of the container 20 (or the insertion surface 211) on the basis of the sensing information. That is, in the facing determination, the work management device 1 determines whether or not the forklift F1 faces the container 20 (or the insertion surface 211).

The work management device 1 outputs a determination result. For example, when the work management device 1 determines that the forklift F1 is not facing the container 20, the work management device 1 outputs a warning (for example, a warning sound, warning light, a warning image, or guidance).

Accordingly, the work management device 1, for example, can notify a worker or the like whether or not the forklift F1 is facing the container 20. That is, the worker or the like can change a direction of the forklift F1 according to a warning, and can cause the forklift F1 to face the container 20. As a result, the worker or the like can insert the forks F101 and F102 straight into the fork pockets 201 and 202 or can pull out the forks F101 and F102 straight from the fork pockets 201 and 202.

A loading platform L1 is an example of a carrying-out destination. The loading platform L1 is a loading platform for a truck or a trailer, a freight car for a freight train, or the like. Tightening devices L11 to L14 are provided in the loading platform L1. The tightening device is a device that is used to connect or fix the container 20.

The container 20 is gripped and transported by the forklift F1, placed on the loading platform L1, and fixed to the loading platform L1 by the tightening devices L11 to L14.

It should be noted that coordinate axes X, Y, and Z illustrated in FIG. 1 are common coordinate axes in the respective drawings of the embodiment and a modification example thereof.

<Forklift>

Figure 2:
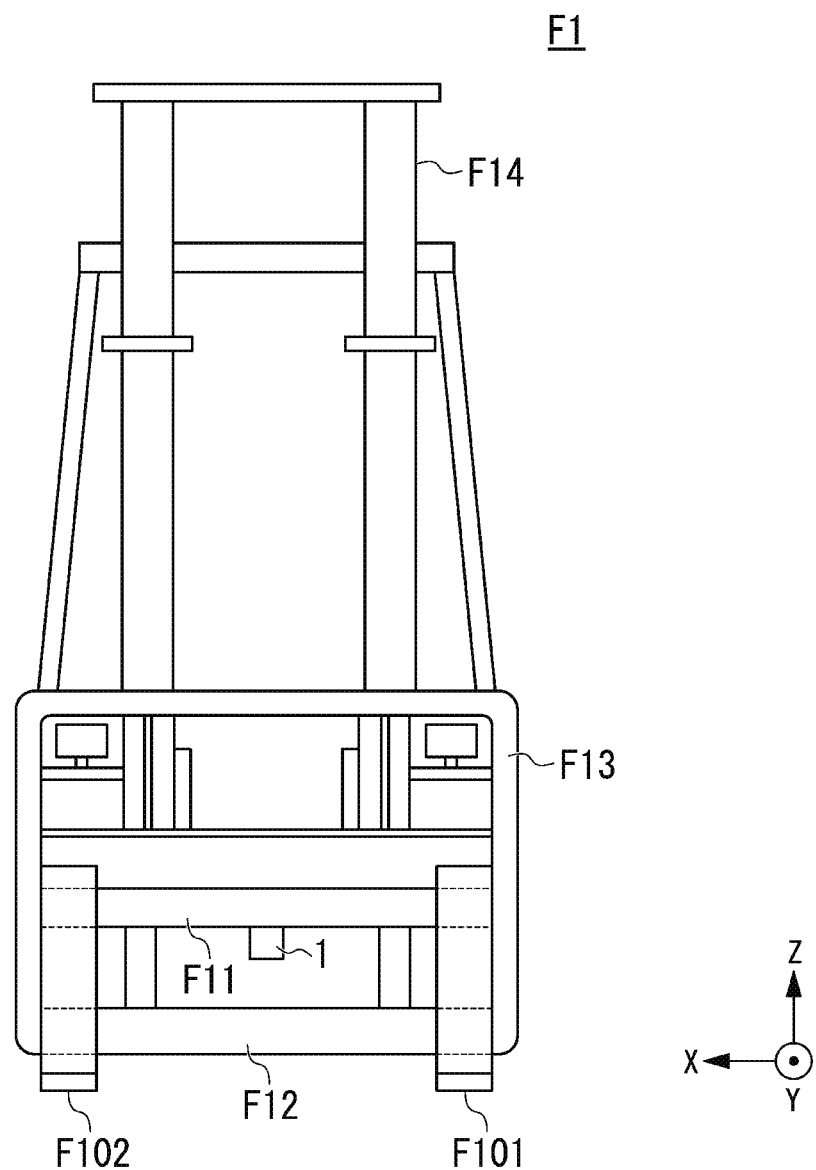
FIG. 2 is a front view illustrating an example of a fixed position of a work management device according to the embodiment.

FIG. 2 is a schematic diagram illustrating an example of a fixed position of the work management device 1 according to the embodiment.

FIG. 2 is a front view of the forklift F1.

Fork rails F11 and F12 (finger bars) are rails for attaching the forks F101 and F102. It should be noted that the fork F101 or the fork F102 is slid along the fork rails F11 and F12 such that an interval between the fork F101 and the fork F102 can be adjusted.

A backrest F13 is attached to the fork rails F11 and F12. The backrest F13 is a mechanism that prevents the gripped container 20 from collapsing or falling to the forklift F1.

A mast F14 is a rail for moving the forks F101 and F102 up and down. When the fork rails F11 and F12 are moved up and down along the mast F14, the forks F101 and F102 are moved up and down.

The work management device 1 is fixed to a central portion (in the X-axis direction) of the fork rail F11, which is the lower surface side (the lower side) of the fork rail F11. However, the work management device 1 may be attached to the upper surface side (the upper side) of the fork rail F11 or the like. Further, the work management device 1 may be attached to the fork rail F12, the backrest F13, the mast F14, or a vehicle body of the forklift F1. Further, a plurality of work management devices 1 or spatial recognition sensors may be attached.

When the work management device 1 is fixed to the fork rail F11, the fork rail F12, and the backrest F13, the container 20 can be irradiated with the laser light without the laser light radiated by the spatial recognition device being blocked. In this case, since the fork rail F11, the fork rail F12, and the backrest F13 move up and down together with the forks F101 and F102 or the container 20, a relative positional relationship between these and the work management device 1 can be fixed.

<Sensing>

Hereinafter, sensing in the work management device 1 (a spatial recognition sensor) will be described.

It should be noted that, in the embodiment, a laser light irradiation scheme in a case in which the work management device 1 performs raster scanning will be described, but the present invention is not limited thereto and another irradiation scheme (for example, Lissajous scan) may be used.

Figure 3:
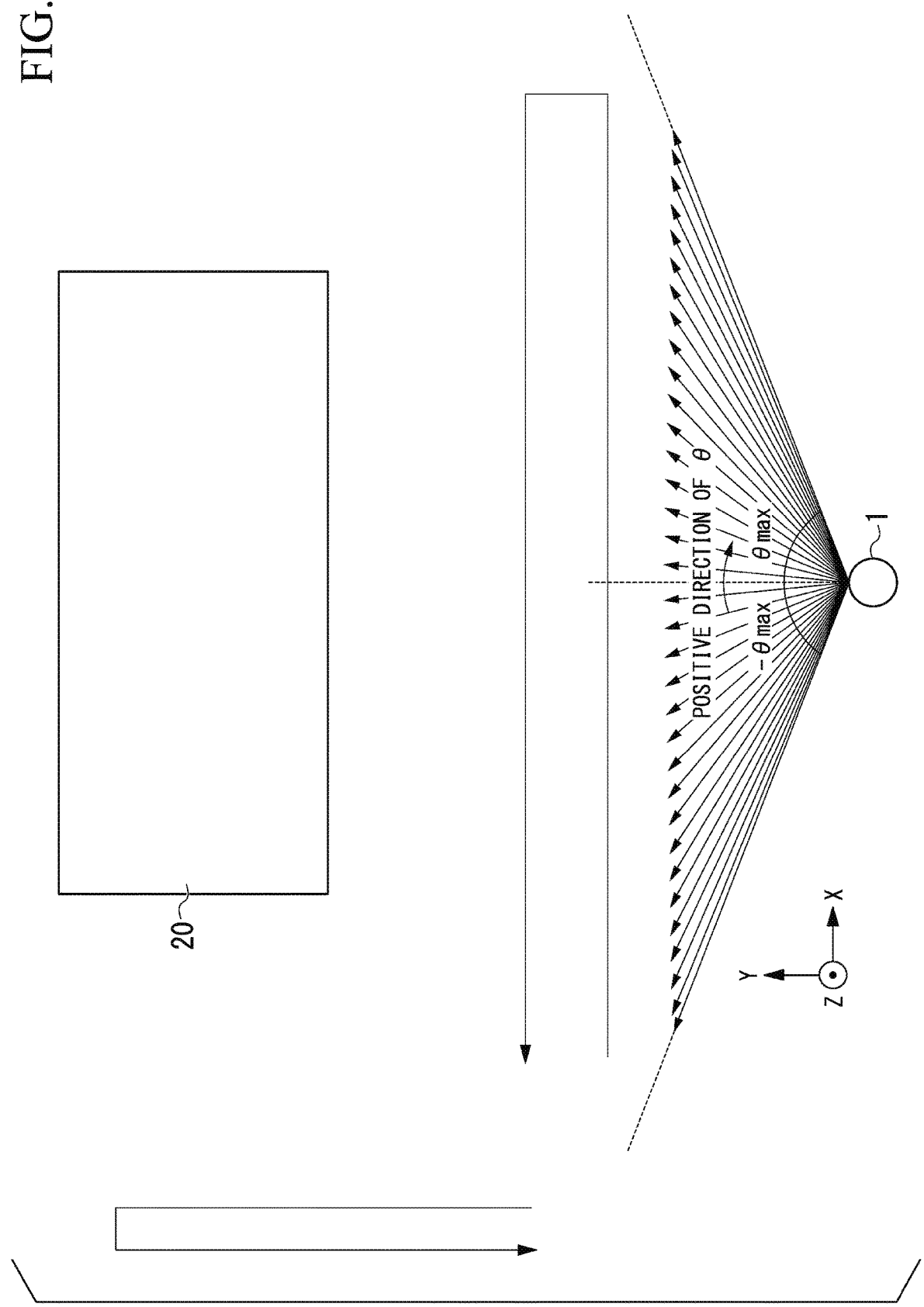
FIG. 3 is a schematic diagram illustrating an example of sensing according to the embodiment.

FIG. 3 is a schematic diagram illustrating an example of sensing according to the embodiment.

FIG. 3 is a diagram in a case in which sequentially radiated laser light is viewed from the upper surface side of the forklift F1. It should be noted that, in FIG. 3, an angle (a polar angle of polar coordinates) in a case in which projection onto an XY plane is performed in a projection direction of the laser light is set to $\theta$. An axis (an initial optical axis to be described below) that is an axis parallel to a Y axis and passing through the work management device 1 (an irradiation port) is set to $\theta=0$.

The work management device 1 performs scanning in a horizontal direction (with other polar angles $\phi$ made constant) by sequentially radiating the laser light in the horizontal direction.

More specifically, the work management device 1 radiates the laser light sequentially (for example, at each equal angle $\Delta\theta$) in a positive direction of the polar angle $\theta$. The work management device 1 irradiates a specific range in the horizontal direction (a range in which a polar angle projected on an XY plane is $-\theta$ max$\leq\theta\leq\theta$ max) with the laser light (also referred to as "horizontal scanning"), shifts an irradiation direction of the laser light in the vertical direction, and then, radiates the laser light in the negative direction of the polar angle $\theta$.

When the horizontal scanning in the negative direction of the polar angle $\theta$ is completed, the work management device 1 further shifts the irradiation direction of the laser light in the vertical direction and performs the horizontal scanning in the positive direction of the X axis again.

Figure 4:
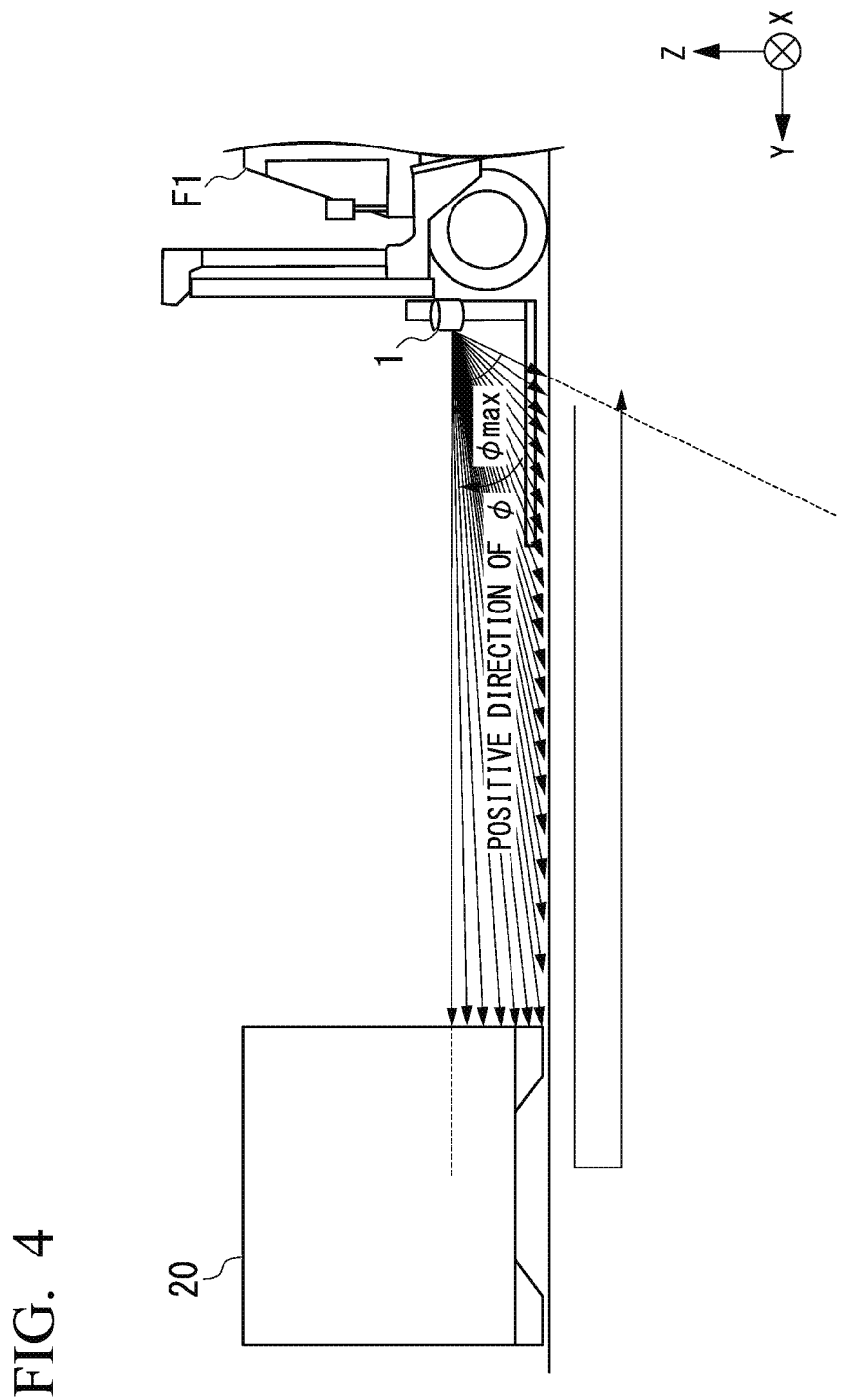
FIG. 4 is a side view illustrating an example of sensing according to the embodiment.

FIG. 4 is another schematic diagram illustrating an example of sensing according to the embodiment.

FIG. 4 is a diagram when irradiation with the laser light is viewed from the side surface of the forklift F1. It should be noted that horizontal scanning in FIG. 3 corresponds to one of arrows in FIG. 4.

In FIG. 4, an angle (a polar angle of polar coordinates) when projection onto a YZ plane is performed in the projection direction of the laser light is set to $\phi$. An axis (an initial optical axis) that is an axis parallel to a Y axis and passing through the work management device 1 (an irradiation port) is set to $\phi=0$.

The work management device 1 shifts the laser light by an equal angle $\Delta\phi$ in a direction of the polar angle $\phi$ for each horizontal scanning. More specifically, the work management device 1 performs horizontal scanning in a positive direction of the polar angle $\theta$, and then, shifts the irradiation direction of the laser light by the equal angle $\Delta\phi$ in the positive direction of the polar angle $\phi$. Thereafter, the work management device 1 performs horizontal scanning in the negative direction of the polar angle $\theta$, and then, further shifts the irradiation direction of the laser light by the equal angle $\Delta\phi$ in the positive direction of the polar angle $\phi$.

The work management device 1 repeats this operation and irradiates a specific range (for example, range of $-\phi$ max (for example, $\phi$ max=90°)$\leq\phi\leq 0$) in the positive direction of the polar angle $\phi$. It should be noted that the work management device 1 may reverse the irradiation in the negative direction of the polar angle $\phi$ after shifting the irradiation by the specific range ($\phi=0$).

It should be noted that the work management device 1 may radiate the laser light in another order or another coordinate system.

Figure 5:
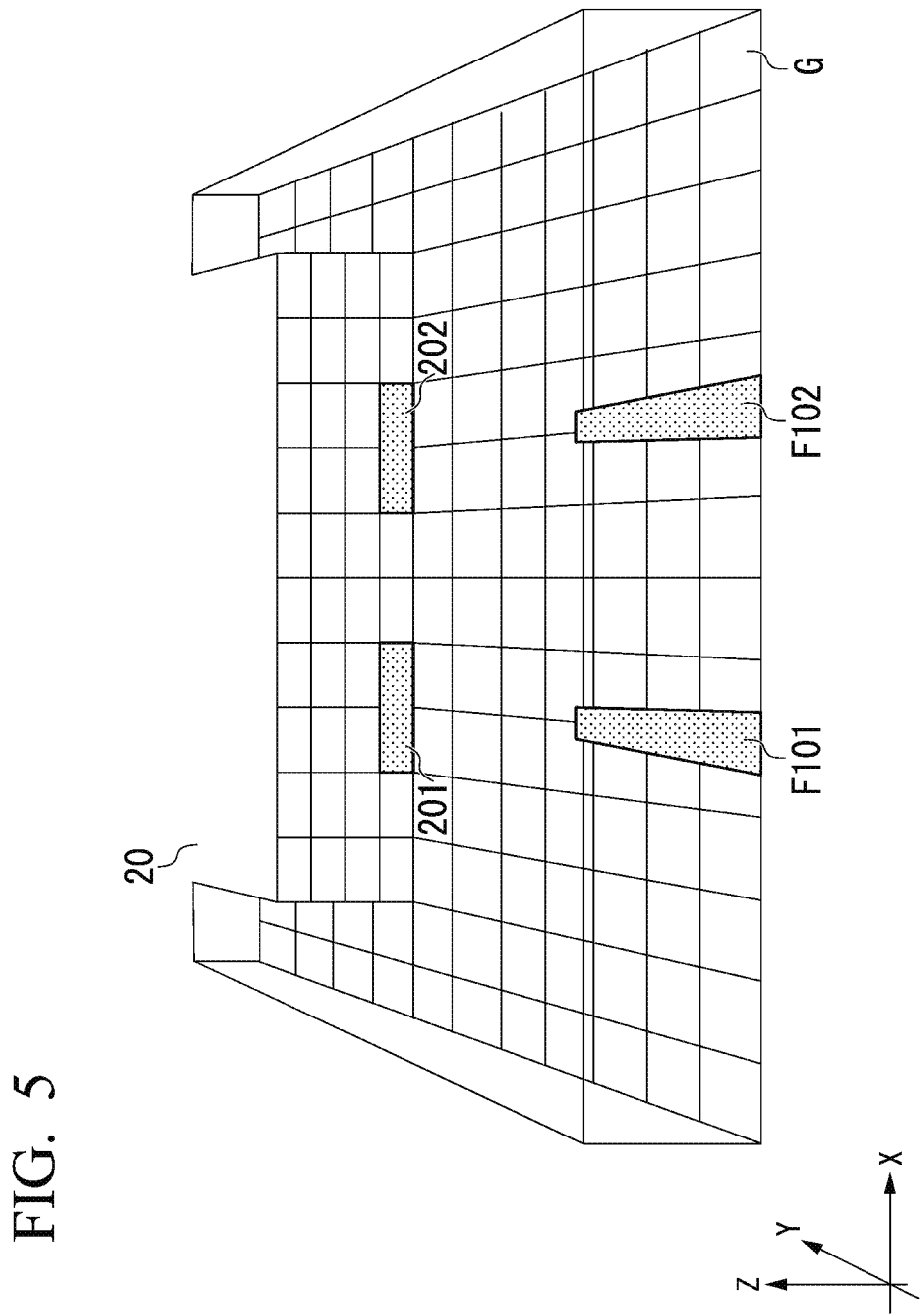
FIG. 5 is a schematic diagram illustrating an example of a sensing result according to the embodiment.

FIG. 5 is a schematic diagram illustrating an example of a sensing result according to the embodiment.

FIG. 5 illustrates sensing information indicating the sensing result in an example of the sensing in FIGS. 3 and 4. The sensing information is, for example, space coordinates. The work management device 1 calculates these space coordinates on the basis of the irradiation direction (the polar angle θ and the polar angle φ) of the laser light and the distance R to a reflection source (an object). The space coordinates are coordinates representing a position of the reflection source in a sensing range. FIG. 5 is a diagram schematically illustrating the space coordinates.

In FIG. 5, the work management device 1 detects the container 20, the fork pockets 201 and 202 of the container 20, and the forks F101 and F102. It should be noted that a surface denoted by reference sign G is a road surface G.

The work management device 1 detects the container 20 (at least part of the insertion surface 211) and the fork pockets 201 and 202 of the container 20 through a first detection process. In an example of the first detection process, for example, the work management device 1 sets a flat or substantially flat surface (including a surface having unevenness) as a plane, and detects a plane perpendicular (in a vertical direction) or substantially perpendicular to the ground or a floor surface. When the work management device 1 detects the fork pockets 201 and 202 in this plane, the work management device 1 determines that the plane is the insertion surface 211 of the container 20.

Here, the work management device 1, for example, detects, as the fork pockets 201 and 202, a portion in which the reflected light of the laser light is not detected and a portion in which a reception level of the reflected light of the laser light is low in the detected plane or a lower portion of the plane.

It should be noted that the work management device 1 may detect, as the fork pockets 201 and 202, a portion in which a distance equal to or greater than a predetermined value is changed (far away) with respect to a distance to the plane in the detected plane or a lower portion of the plane.

Further, the work management device 1 may detect the fork pockets 201 and 202 from the detected plane using the sensing information and the pocket position information. Here, the pocket position information is information indicating a combination of a dimension of the container 20 and a position or dimension (shape) of the fork pockets 201 and 202 in the container 20, or information indicating a pattern of this combination. That is, for example, when there is a predetermined proportion or more of a portion in which the reception level of the reflected light of the laser light is low, at positions at which there are the fork pockets 201 and 202 on the basis of the pocket position information, the work management device 1 may determine that there are the fork pockets 201 and 202 based on the pocket position information.

The work management device 1 detects the forks F101 and F102 through a second detection process.

In an example of the second detection process, for example, the work management device 1 detects a plane extending a specific length or more in a Y-axis direction among planes parallel or substantially parallel to the XY plane, which is a portion smaller than a specific width in the X-axis direction, as the forks F101 and F102. It should be noted that the work management device 1 may store positions and shapes of the forks F101 and F102 in advance.

Figure 6:
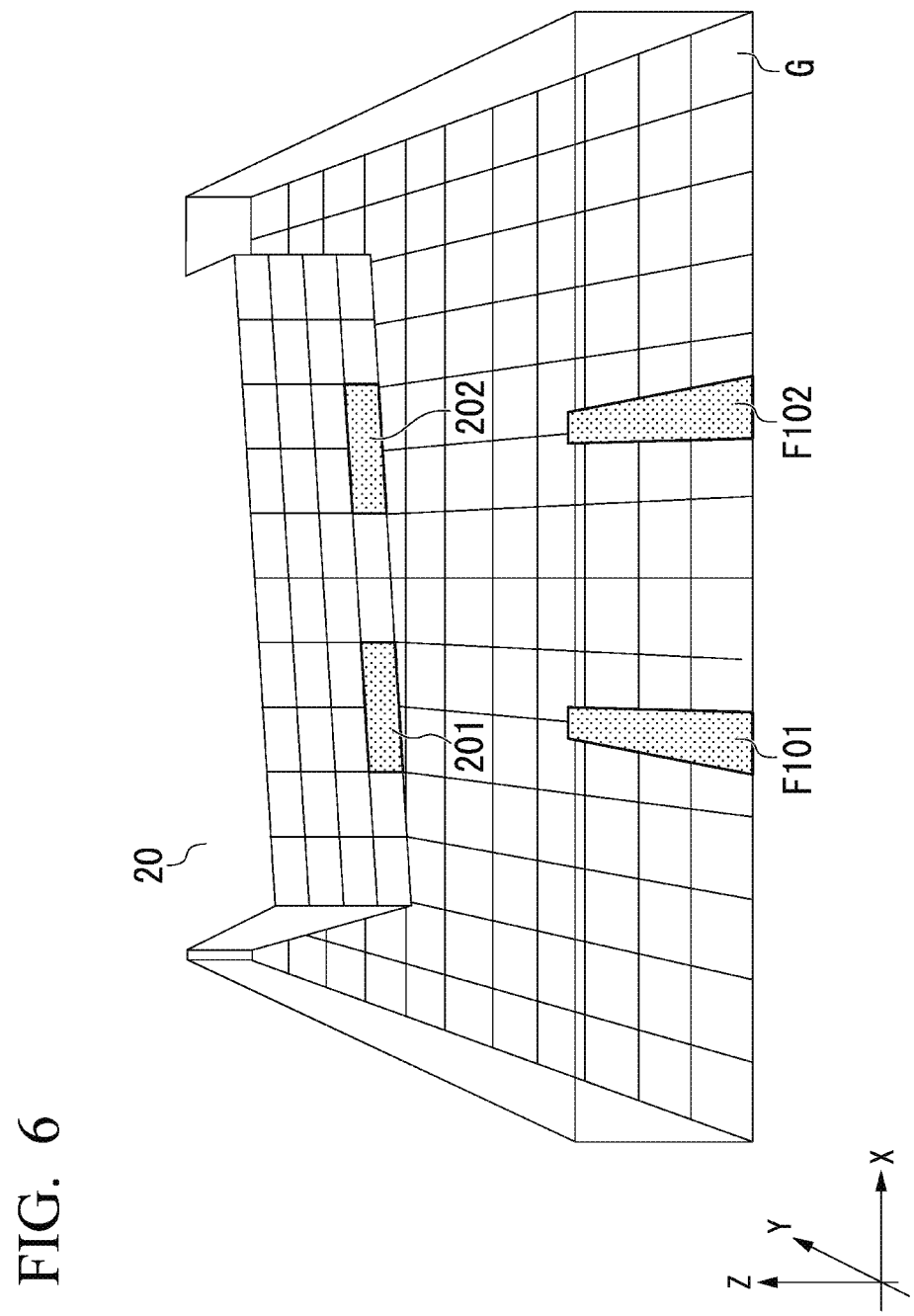
FIG. 6 is a schematic diagram illustrating another example of the sensing result according to the embodiment.

FIG. 6 is a schematic diagram illustrating another example of the sensing result according to the embodiment.

FIG. 5 is the example representing the sensing information when the forklift F1 faces the container 20. FIG. 6 illustrates an example of sensing information when the forklift F1 does not face the container 20.

As illustrated in FIG. 6, the insertion surface 211 of the container 20 does not have a normal direction matching a Y-axis direction, that is, inclined in X-axis and Y-axis directions.

When the forks F101 and F102 are inserted into the fork pockets 201 and 202 in a case in which the forklift F1 does not face the container 20 (the case of FIG. 6), the fork pockets 201 and 202 are damaged or destroyed. Further, when the forklift F1 grips the container 20 as it is, the container 20 cannot be appropriately gripped, or the container 20 is likely to lose its balance and be dropped. That is, it is not possible to appropriately transport a transport target.

In the embodiment, since the work management device 1 performs the facing determination, the forklift F1 can be caused to face the container 20, and the forklift F1 can appropriately grip and transport the container 20.

<Facing Determination>

Figure 7A:
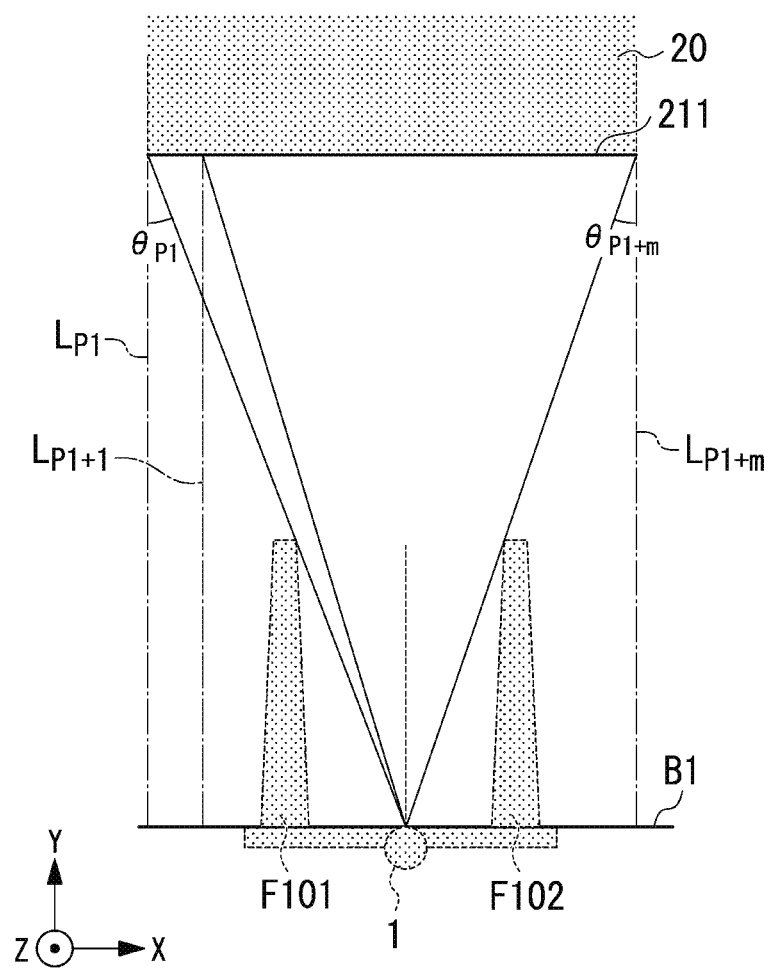
FIG. 7A is a schematic diagram illustrating an example of a facing determination according to the embodiment, and is a diagram illustrating a case in which a forklift faces a container.
Figure 7B:
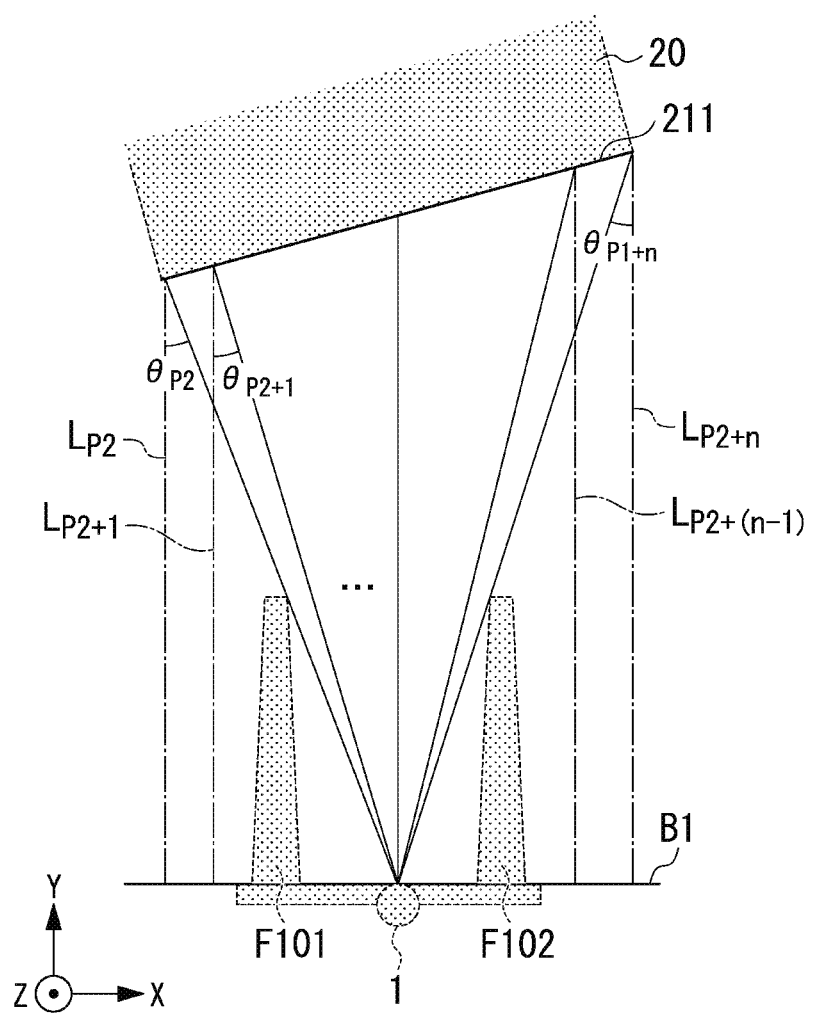
FIG. 7B is a schematic diagram illustrating an example of a facing determination according to the embodiment, and is a diagram illustrating a case in which the forklift does not face the container.

FIGS. 7A and 7B are schematic diagrams illustrating an example of the facing determination according to the embodiment.

FIG. 7A is a diagram in a case in which the forklift F1 faces the container 20. FIG. 7A is a diagram in which the sensing information of FIG. 5 has been projected onto the XY plane.

FIG. 7B is a diagram in a case in which the forklift F1 does not face the container 20. FIG. 7B is a diagram in which the sensing information in FIG. 6 has been projected onto the XY plane.

In FIGS. 7A and 7B, solid lines represent laser light. Further, in FIGS. 7A and 7B, the projection of the container 20, the forks F101 and F102, and the work management device 1 is illustrated with a broken line for convenience.

In FIG. 7A, the work management device 1 detects a plane 211 in a range in which the polar angle θ is $-\theta_{P1} \leq \theta \leq \theta_{P1+m}$.

In FIG. 7B, the work management device 1 detects the plane 211 in a range in which the polar angle θ is $-\theta_{P2} \leq \theta \leq \theta_{P2+n}$. It should be noted that i in $\theta_i$ represents an order in which the laser light is radiated in one horizontal scan, that is, the number of irradiations. For example, $\theta_i = -\theta_{max} + i \times \Delta\theta$.

When the work management device 1 detects the fork pockets 201 and 202 in the detected plane 211, the work management device 1 determines that the plane 211 is the insertion surface (the insertion surface 211) of the container 20.

The work management device 1 performs the facing determination to determine whether or not the forklift F1 faces the insertion surface 211 (the container 20) on the basis of the sensing information. For example, the work management device 1 performs the facing determination by determining whether or not the insertion surface 211 is parallel to a reference surface B1 (whether or not the insertion surface 211 is inclined). Here, the reference surface B1 is a plane parallel to an XZ plane and is a surface perpendicular to a traveling direction when the forklift F1 travels straight. For example, the reference surface B1 is a plane including the work management device 1 (a projection port) in such a plane.

As a specific example of the facing determination, the work management device 1 calculates a distance $L_i$ (referred to as a "reference distance $L_i$") from the reference surface B1 of the forklift F1 to the insertion surface 211 on the basis of a distance $R_i$ from the work management device 1 to the object (the reflection source). Here, the distance $R_i$ represents a distance R detected through the i-th irradiation, which is a distance R from the work management device 1 to the object (the reflection source).

For example, in a case in which an irradiation direction is $\theta_i$ and $\phi$, the work management device 1 calculates the reference distance $L_i = R_i \cos|\phi| \times \cos|\theta_i|$ when the work management device 1 detects the distance $R_i$ to the object. Here, $\phi$ represents a polar angle $\phi$ when the i-th irradiation has been performed.

The work management device 1 performs the facing determination on the basis of a difference $\Delta L_{i,j} = |L_i - L_j|$ between the reference distance $L_i$ and the reference distance $L_j$ ($i \neq j$) on the insertion surface 211. As an example, the work management device 1 performs the facing determination on the basis of a difference $\Delta L_{i+1,i} = |L_{i+1} - L_i|$ between the reference distance $L_i$ and a reference distance $L_{i+1}$ adjacent to each other.

In this case, the work management device 1 determines that the forklift F1 faces the insertion surface 211 (the container 20) when all of the differences $\Delta L_{i+1,i}$ are within a threshold value T1 in the insertion surface 211.

On the other hand, the work management device 1 determines that the forklift F1 does not face the insertion surface 211 (the container 20) when at least one of the differences $\Delta L_{i+1,i}$ is greater than the threshold value T1 in the insertion surface 211.

In FIG. 7A (when the forklift F1 completely faces), $L_i$ has the same value in a range of P1≤i≤P1+m. In this case, for example, in a range of P1≤i≤P1+m−1, a difference $\Delta L_{i+1,i} = |L_{i+1} - L_i| = 0 \leq T1$. In this case, the work management device 1 determines that the forklift F1 faces the insertion surface 211 (the container 20).

In FIG. 7B, $L_i$ is a different value in a range of P2≤i≤P2+n, and for example, $L_i$ is a monotonically increasing function of i. In this case, for example, a difference $\Delta L_{i+1,i} = |L_{i+1} - L_i| > T1$ in a range of P1≤i≤P1+m−1. In this case, the work management device 1 determines that the forklift F1 does not face the insertion surface 211 (the container 20).

Figure 8:
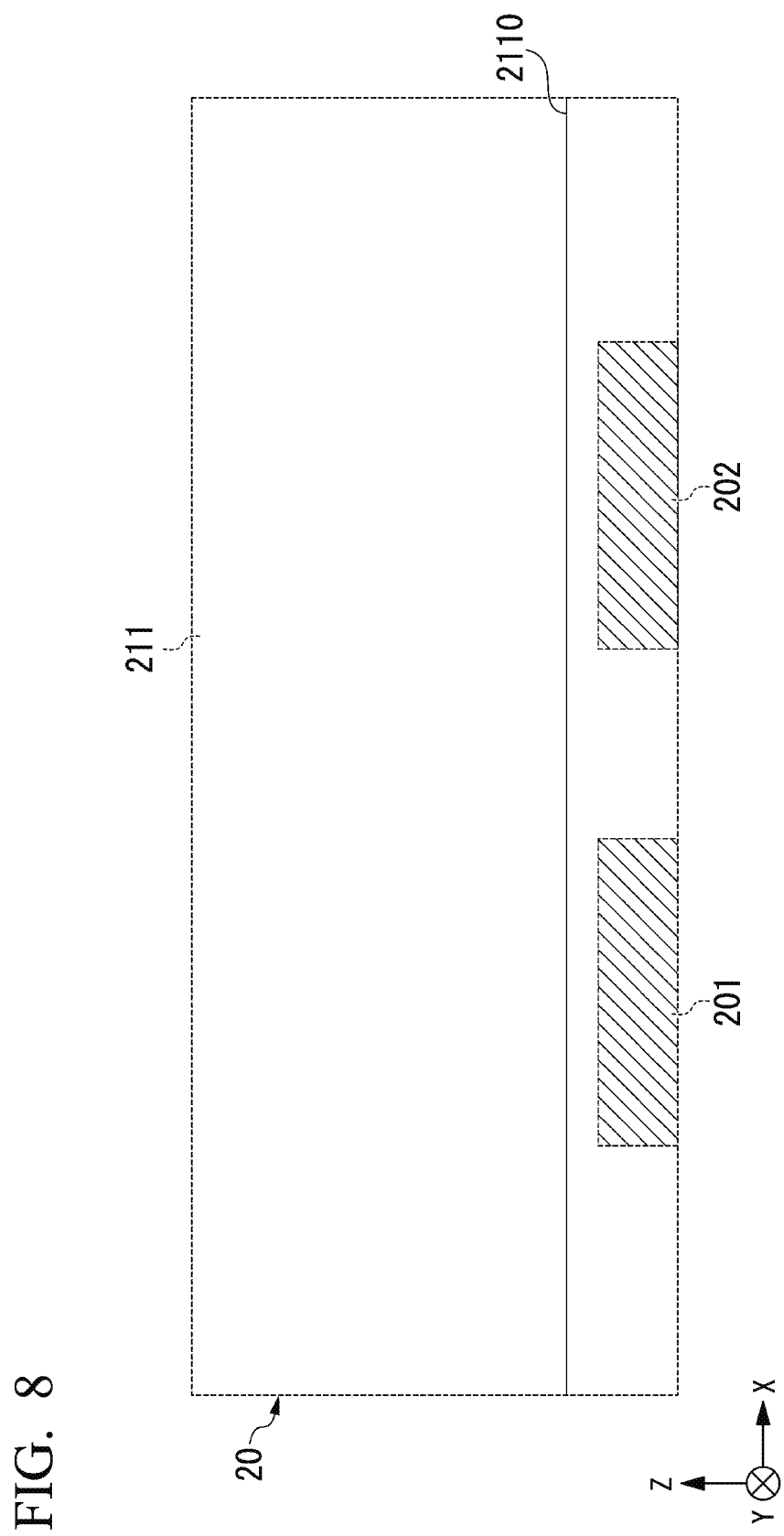
FIG. 8 is a schematic diagram illustrating another example of the facing determination according to the embodiment.

FIG. 8 is another schematic diagram illustrating an example of the facing determination according to the embodiment.

FIG. 8 is a diagram in a case in which the forklift F1 faces the container 20, and is a diagram in which the sensing information of FIG. 5 is projected onto the XZ plane.

The work management device 1 calculates $L_i$, for example, at a position other than the fork pockets 201 and 202 for the container 20 (the insertion surface 211) and performs the facing determination. For example, the work management device 1 may perform horizontal scanning at a position higher than the fork pockets 201 and 202 (a position in which a value is large in a Z-axis direction). For example, this position is located above the top of the fork pockets 201 and 202 in the vertical direction.

In the horizontal scanning in this case, at least two points on the straight line 2110 are irradiated with the laser light. The work management device 1 detects the distance $R_i$ using the reflected light of the laser light with which the straight line 2110 has been irradiated. The work management device 1 performs the facing determination by calculating a reference distance difference $\Delta L_{i,j}$ on the basis of the distance $R_i$ and an irradiation direction $\theta_i$.

<Operation of Forklift>

Figure 9:
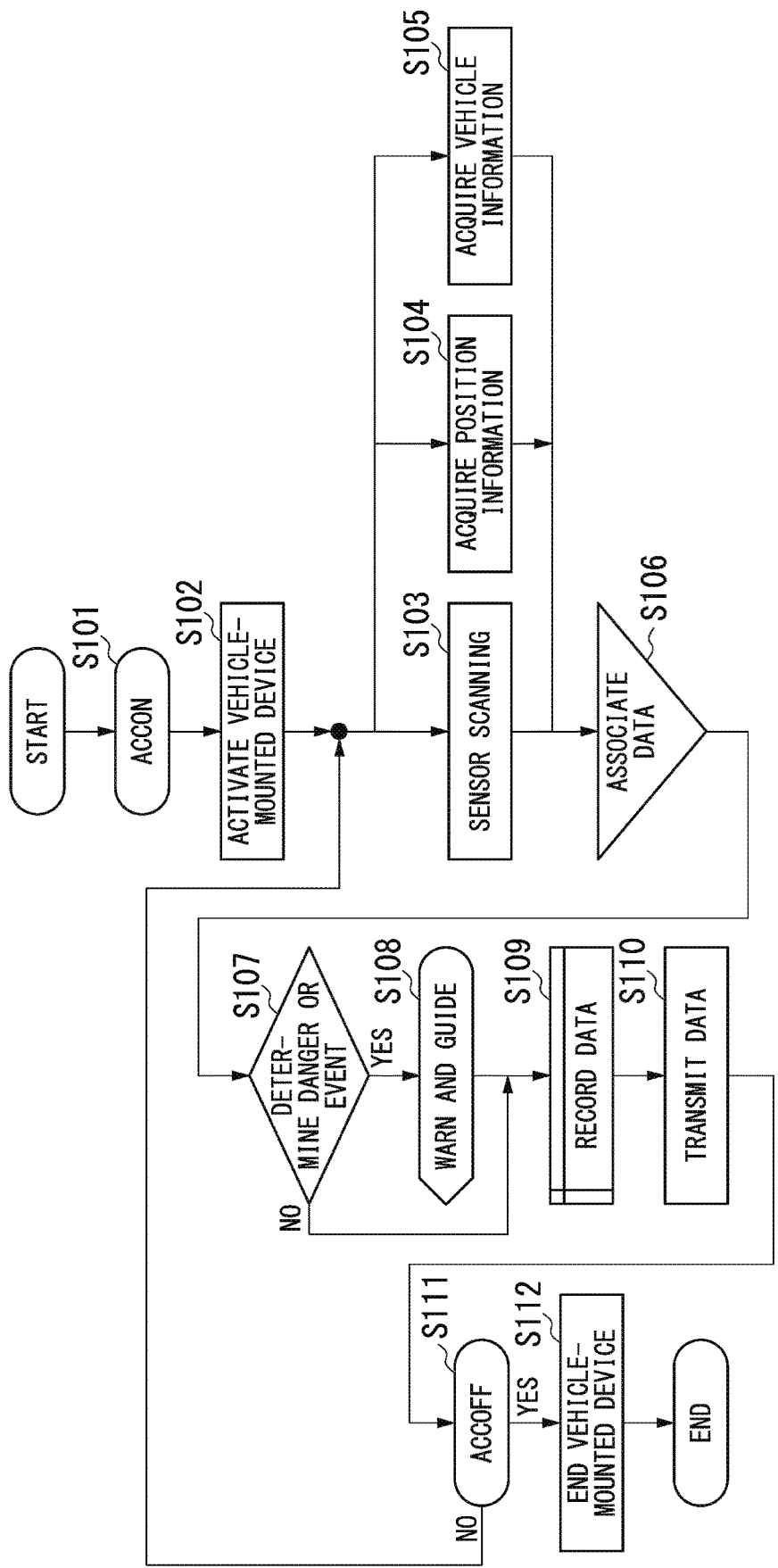
FIG. 9 is a flowchart illustrating an example of an operation of the forklift according to the embodiment.

FIG. 9 is a flowchart illustrating an example of an operation of the forklift F1 according to the embodiment.

(Step S101) The forklift F1 starts up the engine through an operation of the worker or the like (ACC ON). Thereafter, the process proceeds to step S102.

(Step S102) The vehicle-mounted device such as the work management device 1 is activated by acquiring information indicating that power is supplied or the engine is started up. Then, the process proceeds to steps S103, S104, and S105.

(Step S103) The work management device 1 acquires sensing information representing a space using the spatial recognition sensor. Specifically, the work management device 1 radiates the laser light and senses the distance to the object (sensor scan). Thereafter, the process proceeds to step S106.

(Step S104) The work management device 1 acquires position information indicating a position of the forklift F1 (the work management device 1). The position information is, for example, a positioning result of a global positioning satellite system (GNSS). However, the position information may be a positioning result using another wireless communication (for example, a wireless LAN or an RFID tag). Thereafter, the process proceeds to step S106.

(Step S105) The work management device 1 acquires vehicle information indicating a state of the forklift F1 or an operation of a worker or the like. Thereafter, the process proceeds to step S106.

Here, the vehicle information is data that the forklift F1 can output, such as speed, a steering angle, accelerator operation, brake operation, gear rotation (forward, backward, high speed, low speed, or the like), the manufacturer, vehicle type, or vehicle identification information of the forklift F1. Further, the vehicle information may include a position (height) of the forks F101 and F102, the presence or absence of the gripped transport target or a weight thereof, a load situation of a lift chain, fork information indicating types of the forks F101 and F102, or the like, identification information of a worker (a driver), identification information of a work place (a warehouse or a factory) or a company, or work information indicating identification information of a gripped (transported) transport target (for example, acquired by an RFID attached to the transport target, or the like).

(Step S106) The work management device 1 associates the sensing information acquired in step S103, the position information acquired in step S104, and the vehicle information acquired in step S105 (associated data is also referred to as "association data"). For example, the work management device 1 associates the sensing information, the position information, and the vehicle information together with the device identification information of the work management device 1 and an acquisition date and time. Thereafter, the process proceeds to step S107.

(Step S107) The work management device 1 determines the presence or absence of a danger or an event on the basis of the association data associated in step S106. For example, the work management device 1 performs the above facing determination on the basis of the association data. When a determination is made that there is a danger or an event (yes), the process proceeds to step S108. On the other hand, when a determination is made that there is no danger or event (no), the process proceeds to step S109.

(Step S108) The work management device 1 outputs a warning (including guidance) on the basis of a type of danger or event determined in step S107 or data associated with the type. Thereafter, the process proceeds to step S109.

(Step S109) The work management device 1 associates the association data, determination information indicating a determination result in step S107, or output information indicating an output result of the warning in step S108 with one another, and records associated data in the recording device or the like. Thereafter, the process proceeds to step S110.

(Step S110) The work management device 1 transmits the data associated in step S109 to a server or the like. Thereafter, the process proceeds to step S111.

It should be noted that this server is, for example, an information processing device that comprehensively collects and manages data from a plurality of forklifts F1 at a work place or a company. The data transmitted to the server is analyzed using a statistical processing function or a machine learning function. The data transmitted to the server or data of an analysis result is used for driving education or the like. For example, driving data of the worker who is good at loading of the transport target or that is efficient is used as a model. On the other hand, when the transport target is damaged or dropped, data in this case is used for cause investigation or improvement.

(Step S111) When the engine of the forklift F1 is stopped due to an operation of the worker or the like (yes), the process proceeds to step S112. On the other hand, when the engine of the forklift F1 is not stopped (no), the process proceeds to steps S103, S104, and S105. That is, the work management device 1 performs the acquisition of information using sensing or the like, and the data association, recording, and transmission until the engine is stopped.

(Step S112) The vehicle-mounted device such as the work management device 1 stops or enters a sleep state by acquiring information indicating that the supply of power is stopped or the engine is stopped. Thereafter, the operation ends.

<Configuration of Work Management Device>

Figure 10:
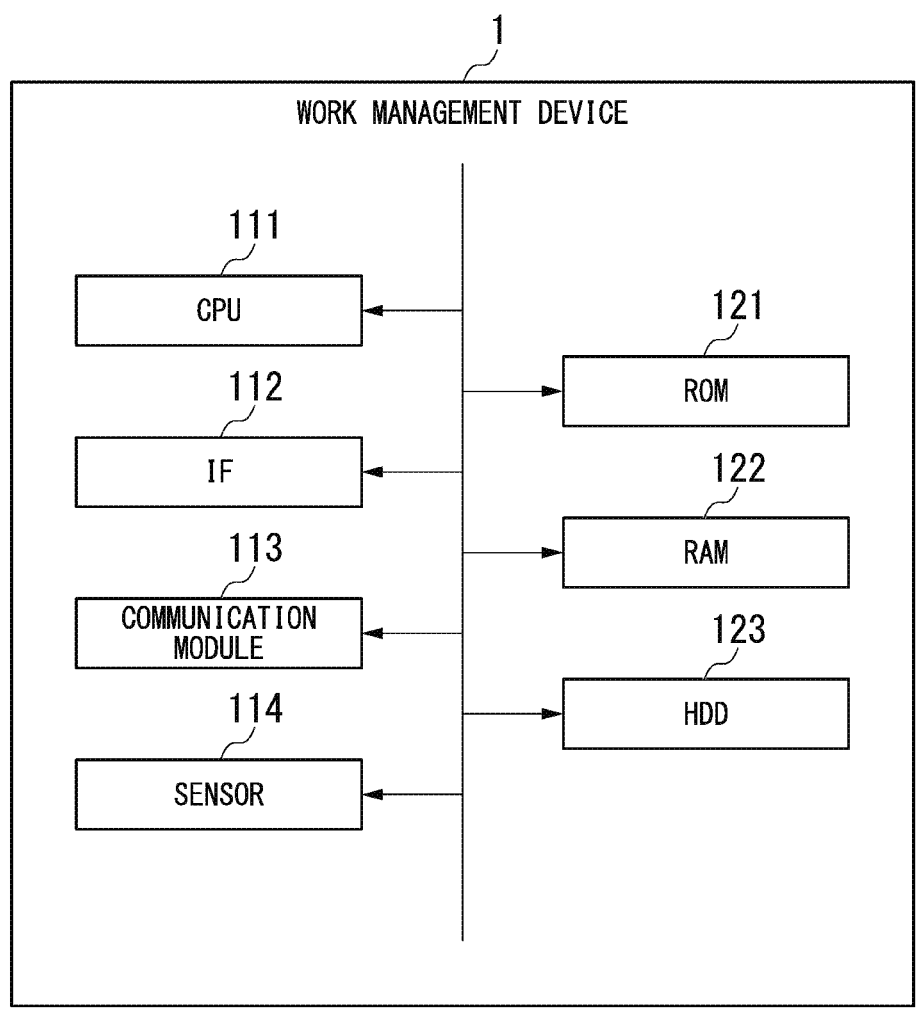
FIG. 10 is a block diagram illustrating a hardware configuration of a work management device according to the embodiment.

FIG. 10 is a schematic block diagram illustrating a hardware configuration of the work management device 1 according to the embodiment. In FIG. 10, the work management device 1 includes a central processing unit (CPU) 111, an interface (IF) 112, a communication module 113, a sensor 114 (for example, a spatial recognition sensor), a read only memory (ROM) 121, a random access memory (RAM) 122, and a hard disk drive (HDD) 123.

The IF 112 is, for example, a portion (a driver's seat, a vehicle body, the mast F14, or the like) of the forklift F1 or an output device (a lamp, a speaker, a touch panel display, or the like) provided in the work management device 1. The communication module 113 performs transmission and reception of signals via a communication antenna. The communication module 113 is, for example, a communication chip such as a GNSS receiver or a wireless LAN. The sensor 114, for example, radiates laser light and performs sensing based on the received reflected light.

Figure 11:
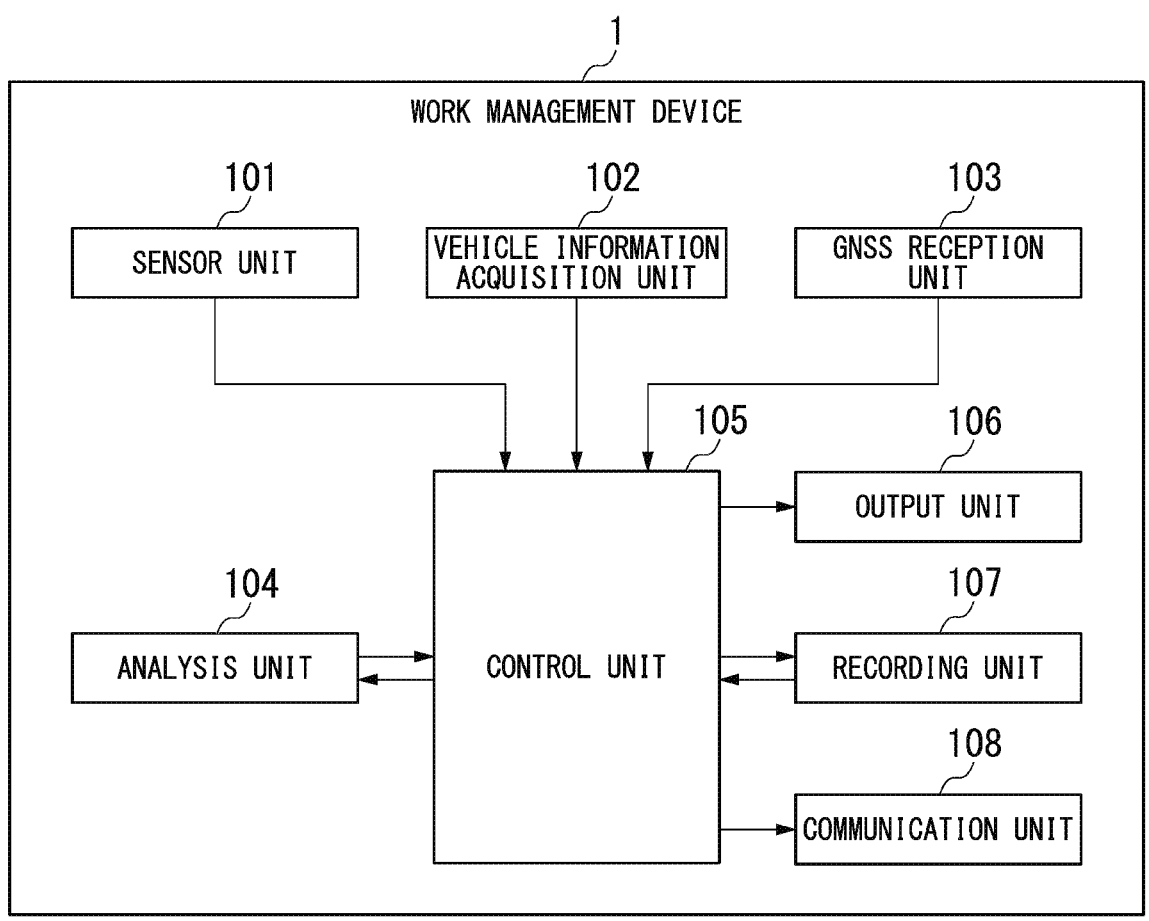
FIG. 11 is a schematic block diagram illustrating a logical configuration of the work management device according to the embodiment.

FIG. 11 is a schematic configuration diagram illustrating a hardware configuration of the work management device 1 according to the embodiment. In FIG. 11, the work management device 1 includes a sensor unit 101, a vehicle information acquisition unit 102, a GNSS reception unit 103, an analysis unit 104, a control unit 105, an output unit 106, a recording unit 107, and a communication unit 108.

The sensor unit 101 is a spatial recognition sensor. The sensor unit 101 senses the distance R from the own device to each object, for example, using laser light. The sensor unit 101 recognizes a space on the basis of an irradiation direction (the polar angles $\theta$ and $\phi$) of the laser light and the sensed distance R. It should be noted that the recognition of the space may mean generation of three-dimensional coordinates for a space including surrounding objects, but the present invention is not limited thereto and the recognition of the space may mean generation of two-dimensional coordinates. The sensor unit 101 generates sensing information (for example, coordinate information) and outputs the sensing information to the control unit 105.

The vehicle information acquisition unit 102 acquires vehicle information from the forklift F1 and outputs the acquired vehicle information to the control unit 105.

The GNSS reception unit 103 acquires position information and outputs the acquired position information to the control unit 105.

The analysis unit 104 acquires the sensing information output by the sensor unit 101, the vehicle information output by the vehicle information acquisition unit 102, and the position information output by the GNSS reception unit from the control unit 105.

The analysis unit 104 generates association data by associating the acquired sensing information, vehicle information, and position information with one another. The analysis unit 104 analyzes the generated association data.

For example, the analysis unit 104 detects the insertion surface 211 (the container 20) by detecting the plane and the fork pockets 201 and 202 through the first detection process based on the sensing information. Further, the analysis unit 104 detects the forks F101 and F102 through the second detection process based on the sensing information. Further, the analysis unit 104 calculates the reference distance $L_i$ with respect to at least two points of the detected insertion surface 211 on the basis of the acquired sensing information, and calculates the difference $\Delta L_{i,j}$.

The control unit 105 acquires the sensing information output by the sensor unit 101, the vehicle information output by the vehicle information acquisition unit 102, and the position information output by the GNSS reception unit, analyzes the information using, for example, the analysis unit 104 and performs the determination on the basis of an analysis result.

For example, the control unit 105 determines the presence or absence of danger or an event. The control unit 105 performs the above-described facing determination as one of the determinations.

Specifically, when the analysis unit 104 detects the fork pockets 201 and 202, the control unit 105 determines that the detected plane is the insertion surface 211 of the container 20. The control unit 105 performs the above-described facing determination on the insertion surface 211 on the basis of the difference $\Delta L_{i,j}$ calculated by the analysis unit 104.

The control unit 105 causes a warning (including guidance) to be output from the output unit 106 on the basis of the determination result or and data associated with the determination result.

The control unit 105 records determination information indicating and data associated with the determination result on the recording unit 107 and transmits the determination information and the association data to a server or the like via the communication unit 108.

It should be noted that the sensor unit 101 is realized by the sensor 114 in FIG. 10. Similarly, the vehicle information acquisition unit 102 and the GNSS reception unit 103 are realized by the communication module 113, for example. The analysis unit 104 and the control unit 105 are realized by, for example, a CPU 111, a ROM 121, a RAM 122, or an HDD 123.

<Facing Determination when Forks are Pulled Out>

Hereinafter, the facing determination when the forks F101 and F102 are pulled out will be described.

The work management device 1 (the control unit 105) also performs the facing determination when the forks F101 and F102 are pulled out.

Figure 12:
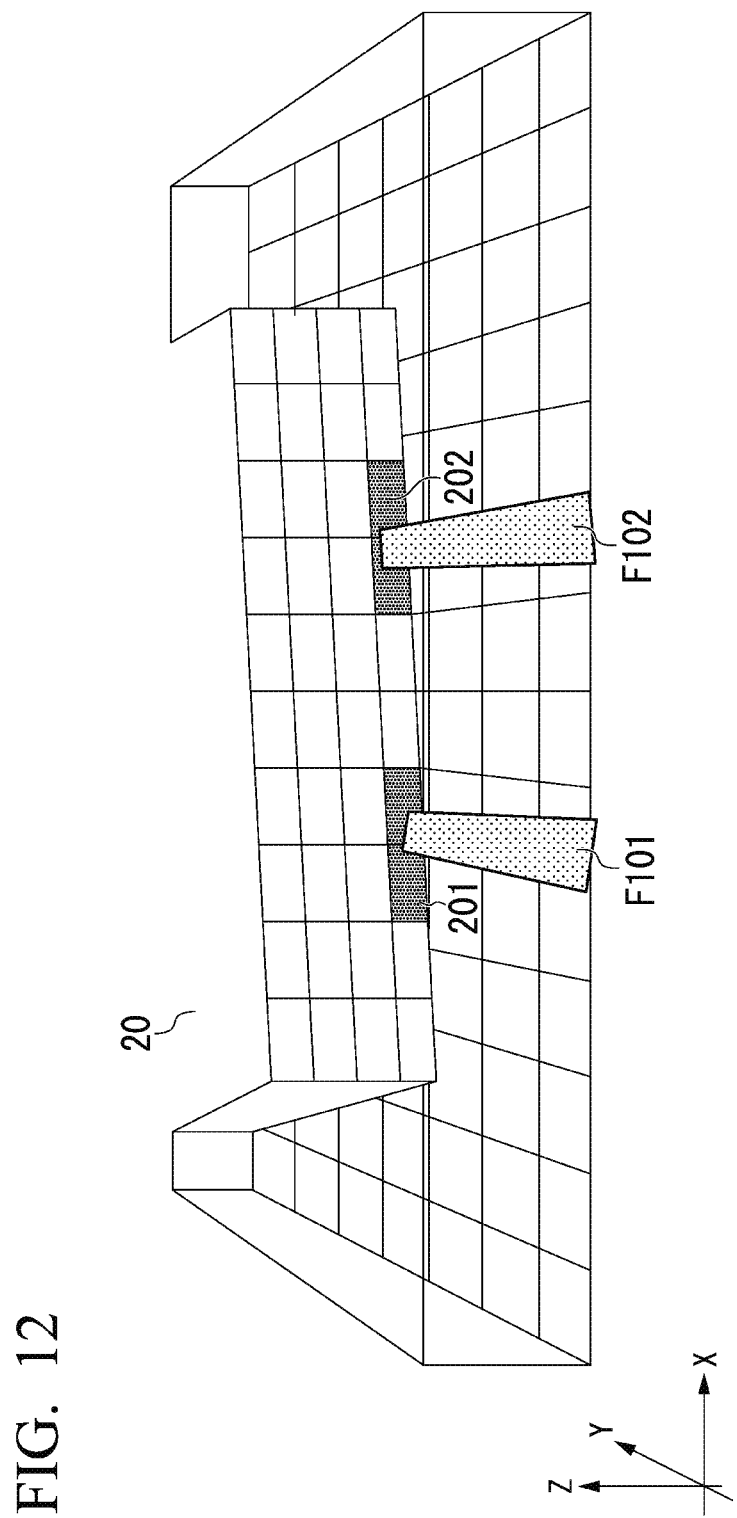
FIG. 12 is a schematic diagram illustrating another example of the sensing result according to the embodiment.

FIG. 12 is a schematic diagram illustrating another example of the sensing result according to the embodiment.

FIG. 12 illustrates an example of sensing information when the forks F101 and F102 are not completely pulled out from the fork pockets 201 and 202 when the forks F101 and F102 are pulled out.

Further, FIG. 12 illustrates an example illustrating sensing information representing the sensing result when forklift F1 does not face the container 20. As illustrated in FIG. 12, the insertion surface of the container 20 is inclined in X-axis and Y-axis directions.

When the forks F101 and F102 are pulled out without facing the container 20, a portion of the forks is likely to collide with the container 20 and the fork pockets 201 and 202 are likely to be damaged or destroyed or the container 20 may be dropped.

In the embodiment, the work management device 1 performs the facing determination even when the forks F101 and F102 are pulled out. Thus, the forklift F1 can be caused to face the container 20 and appropriately pulls out the forks F101 and F102 from the container 20.

(Conclusion of Embodiment)

Figure 13:
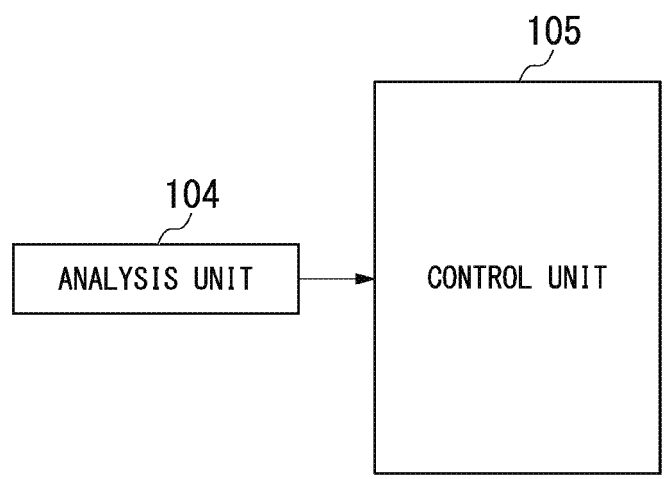
FIG. 13 is another schematic block diagram illustrating the logical configuration of the work management device according to the embodiment.

As described above, in the embodiment, the work management device 1 is a vehicle-mounted device mounted in the forklift F1 (the cargo handling machine). As illustrated in FIG. 13, the work management device 1 (the forklift F1) detects the container (an insertion target) 20 into which the forks F101 and F102 (insertion blades) are inserted on the basis of the sensing information that the analysis unit 104 has acquired from the spatial recognition sensor (a spatial recognition device). The control unit 105 performs a facing determination to determine whether or not the forklift F1 faces the insertion surface 211 having the openings (the insertion portions) of the fork pockets 201 and 202 on the basis of the sensing information.

Accordingly, the work management device 1 can cause the forklift F1 to face the transport target such as the container 20, and the forklift F1 can transport the transport target appropriately. For example, the forklift F1 can prevent the fork pockets 201 and 202 from being damaged or destroyed. Further, the forklift F1 can grip the container 20 appropriately (with a good balance and stability) and transport the container 20 and can prevent the container 20 from being dropped.

Further, since the spatial recognition device recognizes the space coordinates, the spatial recognition device can perform the facing determination with high accuracy as compared with a proximity sensor such as an RFID in some cases. However, in the present invention, the proximity sensor may also be adopted.

Further, since the spatial recognition device determines whether or not the forklift faces the container 20, it is possible to determine whether or not the forklift faces the container 20 in an actual positional relationship (including a direction) between the forklift F1 and the container 20. For example, even when the forklift F1 does not move along an assumed trajectory in automatic operation, it is possible to perform trajectory correction or the like when a determination is made that the forklift F1 does not face the container 20.

Further, in the embodiment, in the work management device 1, the control unit 105 determines whether or not the forklift F1 faces the insertion surface 211 according to a difference based on the distances $R_i$ and $R_j$ to at least two points of the insertion surface 211. The at least two points are located above the top of the fork pockets 201 and 202 in a vertical direction.

In the transport target to be transported by the forklift, fork pockets are provided in a lower portion, and a continuous plane (a portion of the insertion surface 211) is provided in an upper portion. The work management device 1 can perform the facing determination using this continuous plane and can perform the facing determination more accurately.

It should be noted that the work management device 1 may perform horizontal scanning in a position higher than a top of the fork pockets 201 and 202 in a vertical direction and lower than a specific height, and perform the facing determination on the basis of the distance $R_i$ detected by the horizontal scanning and the irradiation direction $\theta_i$. This specific height may be determined, for example, on the basis of a height of a pallet. Accordingly, the work management device 1 can perform the facing determination on the basis of a plane of the pallet even when there is no plane on the transport target mounted in the pallet.

MODIFICATION EXAMPLE A1

In the above embodiment, the control unit 105 (the forklift F1 or the work management device 1) may output a warning in a case in which the forklift F1 is in proximity to the insertion surface 211 (the container 20) when the forklift F1 does not face the container 20.

Specifically, when the control unit 105 determines that the forklift F1 does not face, the output unit 106 may output the warning in a case in which the forklift F1 is in proximity to the insertion surface 211. Being in proximity to the insertion surface 211 is, for example, a case in which the reference distance $L_i$ to a point on the insertion surface 211 is equal to or smaller than a threshold value. On the other hand, even when the control unit 105 determines that the forklift F1 does not face, the output unit 106 may not output the warning in a case in which the forklift F1 is not in proximity to the insertion surface 211.

Accordingly, the work management device 1 can prevent the output of the warning even when a need for the warning is low. For example, when the forklift F1 is located far from the container 20, the forklift F1 is likely not to transport the container 20. Further, a worker or the like may not cause the forklift to face the container 20 at a position far from the container 20, and may cause the forklift to face the container 20 after approaching the container 20. In such a case, the work management device 1 can stop the output of the warning.

MODIFICATION EXAMPLE A2

In the above embodiment, the control unit 105 (the forklift F1 or the work management device 1) may perform the facing determination in a period in which the forks F101 and F102 are not completely pulled out from the fork pockets 201 and 202.

Specifically, when the gear is in a backward direction, the control unit 105 determines whether or not the forks F101 and F102 are completely pulled out from the fork pockets 201 and 202. For example, the control unit 105 stores positions and shapes of the forks F101 and F102 (referred to as "forks D101 and D102") in advance.

The control unit 105 determines whether or not the forks D101 and D102 stored in advance are detected in the sensing information. As a specific example, the control unit 105 compares Z coordinates of the forks D101 and D102 with Z coordinates of the sensing information in all of X and Y coordinates at which the forks D101 and D102 exist, and determines whether or not the coordinates match.

The control unit 105 determines that the forks F101 and F102 have been completely pulled out from the fork pockets 201 and 202 when the control unit 105 determines that the forks D101 and D102 stored in advance are detected (the Z coordinates match).

On the other hand, the control unit 105 determines that the forks F101 and F102 have not been completely pulled out from the fork pockets 201 and 202 when the control unit 105 determines that the forks D101 and D102 stored in advance are not detected (the Z coordinates do not match).

The control unit 105 may perform the facing determination while the control unit 105 is determining that the forks F101 and F102 have not been completely pulled out from the fork pockets 201 and 202. On the other hand, the control unit 105 may not perform the facing determination or the warning after determining that the forks F101 and F102 have been completely pulled out from the fork pockets 201 and 202 when the gear is in a backward direction.

MODIFICATION EXAMPLE A3

In the above embodiment, when the control unit 105 (the forklift F1 or the work management device 1) determines that the forklift F1 faces the container 20, the control unit 105 may output a warning on the basis of vehicle information indicating the steering angle of the forklift F1 (the vehicle) in which the own device is mounted.

Accordingly, immediately after the forklift F1 is determined to face, the forklift F1 can warn that the forklift F1 is bent and does not face.

Specifically, when the control unit 105 determines that the forklift F1 faces the container 20 and the steering angle indicated by the vehicle information is greater than the threshold value (when the forklift F1 is bent in a straight forward direction), the control unit 105 causes the output unit 106 to output a warning.

That is, when the control unit 105 determines the forklift F1 faces, the output unit 106 outputs a warning on the basis of the vehicle information indicating the steering angle of the forklift F1. Here, the output unit 106 outputs the warning when the movement direction of the forklift F1 is bent on the basis of the vehicle information indicating the steering angle of the forklift F1.

It should be noted that the control unit 105 may determine whether or not the movement direction of the forklift F1 is bent on the basis of the sensing information. The control unit 105 determines that the movement direction of the forklift F1 is bent, for example, when each detected object is displaced in a specific rotation direction. In this case, the output unit 106 outputs a warning.

MODIFICATION EXAMPLE B1

Fork-Based Facing Determination

In the above embodiment, the control unit 105 (the forklift F1 or the work management device 1) may adopt the following facing determination. For example, the control unit 105 may perform the facing determination on the basis of the detected forks F101 and F102. Specifically, the control unit 105 performs the facing determination according to a degree of hiding of the forks F101 and F102 on the basis of the shape of the forks F101 and F102.

Figure 14A:
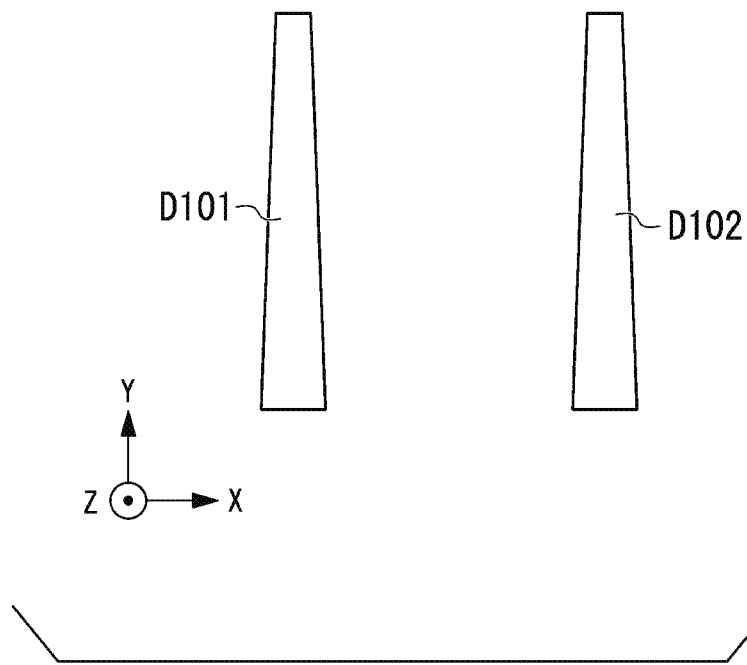
FIG. 14A is a schematic diagram illustrating an example of a detection result of a fork according to a modification example of the embodiment.
Figure 14B:
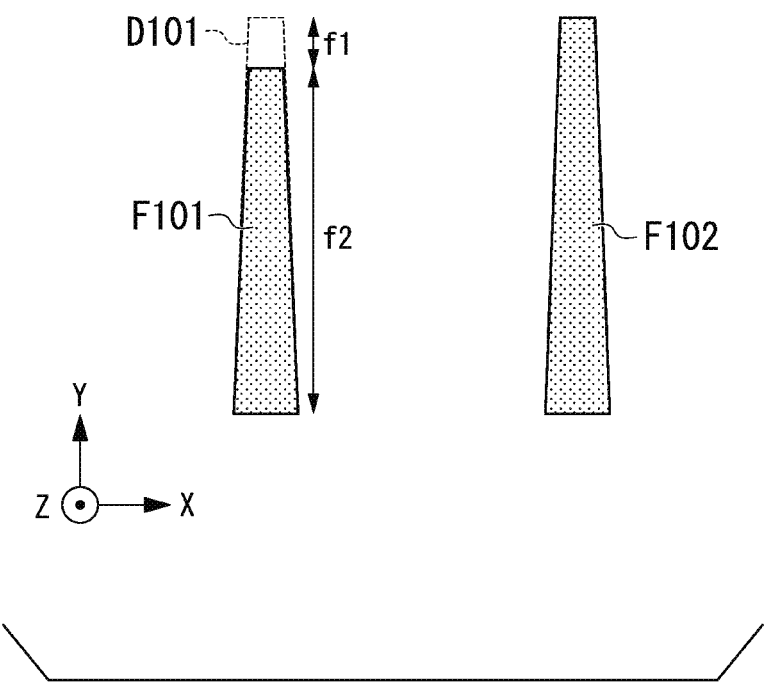
FIG. 14B is a schematic diagram illustrating an example of a detection result of the fork according to the modification example of the embodiment, and is a diagram illustrating a case in which a forklift does not face a container.

FIGS. 14A and 14B are schematic diagrams illustrating an example of detection results of forks F101 and F102 according to the modification example of the embodiment.

For example, the work management device 1 performs sensing in a state in which the fork of the forklift F1 is completely sensed, and detects the fork of the forklift F1. For example, this state is when an engine is started up, when the work management device 1 is attached to the forklift F1, or when shipment of the forklift F1 is performed. The forks detected in this case are referred to as the forks D101 and D102.

In FIG. 14A, the forks D101 and D102 are detected.

The control unit 105 stores the shapes or positions of the forks D101 and D102.

Thereafter, the work management device 1 performs sensing to detect the forks F101 and F102 of the forklift F1.

The control unit 105 compares the detected forks F101 and F102 of the forklift F1 with the stored forks D101 and D102.

As a result of the comparison, for example, when either the shape of the fork F101 and the fork D101 or the shape of the fork F102 and the fork D102 is different, the control unit 105 determines that the fork F101 or F102 is not pulled out.

Further, the control unit 105 determines whether or not a difference in an area or length of the shape is greater than a threshold value for a portion of the fork F101 and the fork F102 pulled out or a portion not pulled out.

Further, when the difference is greater than the threshold value, the control unit 105 determines that the forklift does not face. When the difference is equal to or smaller than the threshold value, the control unit 105 determines that the forklift faces.

FIG. 14B is, for example, a diagram in a state illustrated in FIG. 12 and is a diagram in a case in which the forklift F1 does not face the container 20. FIG. 14B is a diagram in a case in which the fork F102 is pulled out from the fork pocket 202, whereas the fork F101 is not pulled out from the fork pocket 201.

In this case, the control unit 105 determines that the coordinates of a distal end portion of the fork F101 are different from those of the fork D101 (a broken line), and determines that a portion having different coordinates is inserted into the fork pocket 201. For example, the control unit 105 determines that the fork F101 is inserted into the fork pocket 201 by a length f1 or pulled out from the fork pocket 201 by a length f2.

On the other hand, the control unit 105 determines that the fork F102 and the fork D101 are the same. In this case, the control unit 105 determines that the fork F102 is pulled out from the fork pocket 202.

For example, the control unit 105 determines that the difference between the length is f1 and determines whether or not the difference f1 is greater than a threshold value. When the difference f1 is greater than the threshold value, the control unit 105 determines that the forklift does not face.

As another modification example, for example, when the forks D101 and D102 are line-symmetrical with respect to the right and left (the X-axis direction), the control unit 105 may determine whether or not the detected forks F101 and F102 have the same line symmetry to determine whether or not the forklift faces. It should be noted that the control unit 105 may perform the facing determination based on the forks F101 and F102 immediately after the transport target is lowered or when the gear is in a backward direction, and may not perform the facing determination in other cases.

MODIFICATION EXAMPLE B2

Modification Example of Facing Determination

In the above embodiment, the control unit 105 (the forklift F1 or the work management device 1) may adopt the following facing determination. Specifically, the control unit 105 may perform the facing determination on the basis of a predetermined difference $\Delta L_{i,j}$ between numbers or may perform the facing determination on the basis of a predetermined difference $\Delta L_{i,j}$ between positions.

For example, the control unit 105 may determine that the forklift faces when a predetermined difference $\Delta L_{i,j}$ between the numbers Ni among the differences $\Delta L_{i,j}$ in the insertion surface 211 is within a threshold value T11, and may determine that the forklift does not face when a predetermined difference $\Delta L_{i,j}$ between the numbers N2 is greater than a threshold value T12. It should be noted that the threshold values T11 and T12 or the numbers N1 and N2 may be the same value or may be different values.

For example, the control unit 105 may compare the difference $\Delta L_{i,j}$ between the reference distance $L_i$ of a center (for example, polar angle $\theta=0$) and the reference distance $L_j$ of a predetermined distance (or the polar angle $\theta$, an irradiation number i or j) from the center with the threshold value T1 to make the facing determination.

For example, the control unit 105 may compare the difference $\Delta L_{i,j}$ between reference distances $L_i$ separated by a predetermined distance or more with the threshold value T1, or may compare a difference $\Delta L_{i,j}$ between a reference distance $L_i$ of a detected end (an edge portion) of the container 20 or the vicinity thereof and a reference distance $L_j$ of another position (for example, an adjacent position, the other end or the vicinity thereof, a center, or a position separated from the end by a predetermined distance or more) with the threshold value T1.

For example, the control unit 105 may extract the reference distance $L_i$ for each predetermined distance (or the polar angle $\theta$, the number of irradiations i or j), and make the facing determination on the basis of the difference $\Delta L_{i,j}$ of the pulled out reference distances $L_i$. For example, when the reference distance $L_i$ each time the number of irradiations is 10 times is used, the control unit 105 may use $\Delta L_{P+10,P}=|L_{P+10}-L_P|$ or $\Delta L_{P+20,P+10}=|L_{P+20}-L_{P+10}|$, $\Delta L_{P+30,P+20}=|L_{P+10}-L_P|$, and an average value thereof.

Further, the control unit 105 may perform the facing determination in consideration of the unevenness on the insertion surface 211.

Figure 15A:
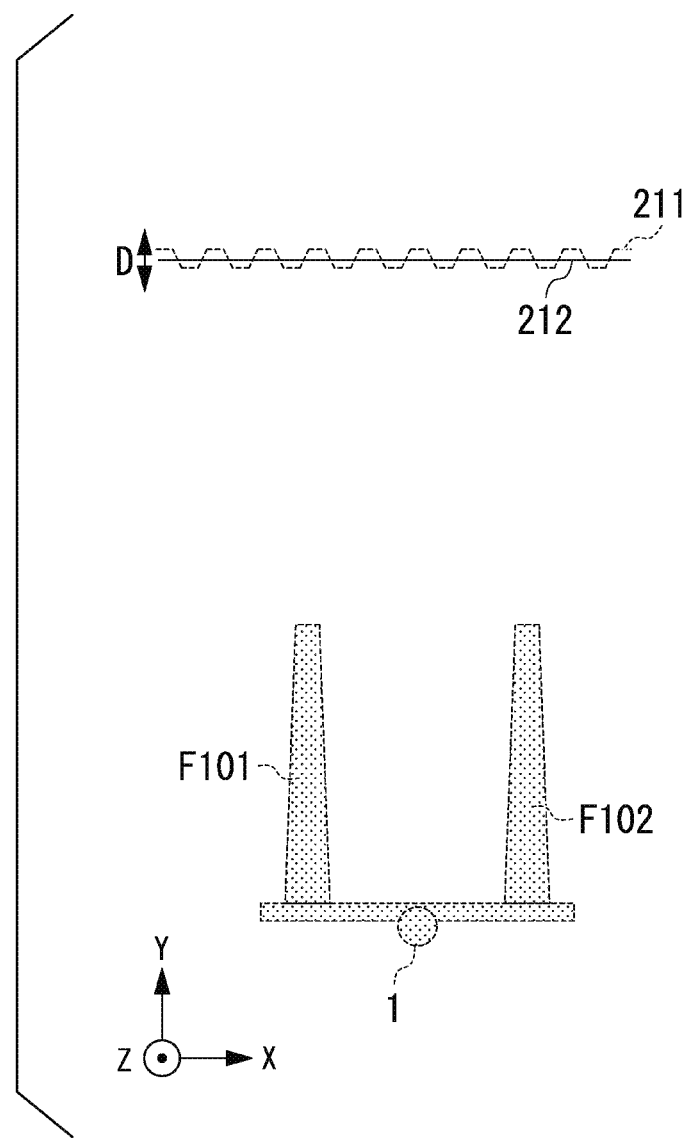
FIG. 15A is a schematic diagram illustrating an example of a facing determination according to the modification example of the embodiment, and is a diagram illustrating a case in which the forklift faces the container.
Figure 15B:
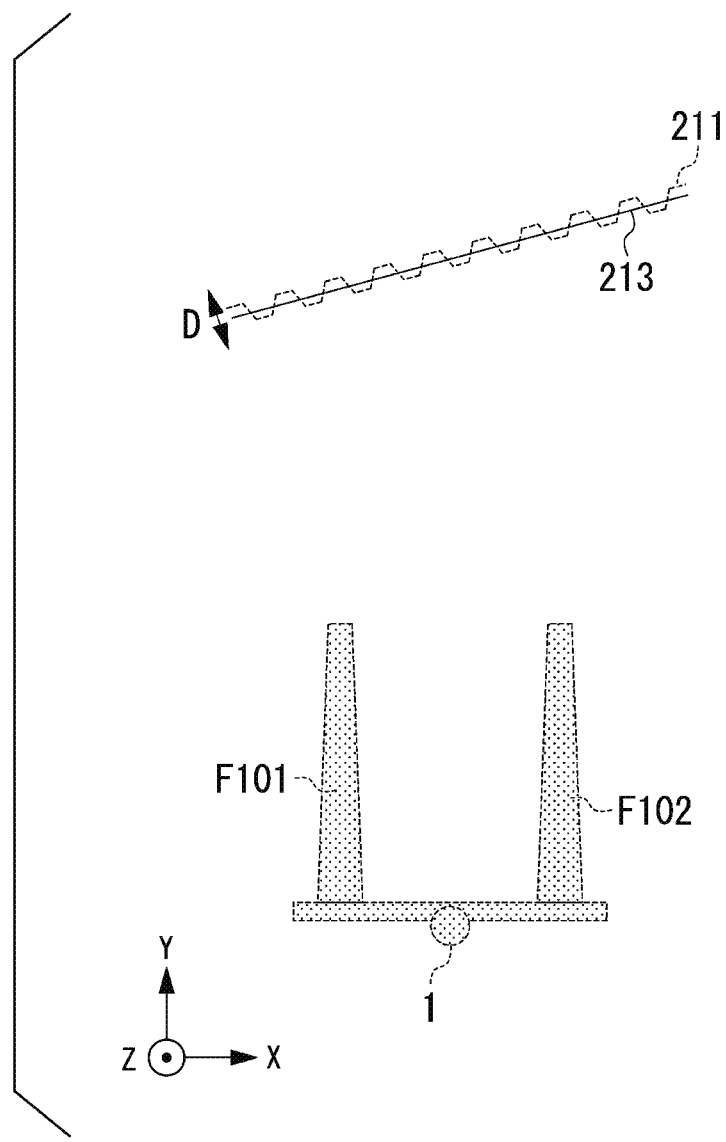
FIG. 15B is a schematic diagram illustrating an example of the facing determination according to the modification example of the embodiment, and is a diagram illustrating a case in which the forklift does not face the container.

FIGS. 15A and 15B are schematic diagrams illustrating an example of the facing determination according to the modification example of the embodiment.

In FIGS. 15A and 15B, the surface of the container 20 indicated by a chain line has unevenness. In this case, a difference $\Delta L_{i,j}$ between a reference distance $L_i$ of a convex portion and a reference distance $L_j$ of a concave portion is greater than an actual inclination of the insertion surface 211 (an average value of coordinates of the insertion surface 211, for example, a straight line 212).

For example, the convex portion and the concave portion are separated by a distance D (also referred to as a unevenness distance D) in a normal direction (Y-axis direction in FIG. 15A) of the insertion surface. When the sensor unit 101 detects the convex portion and the concave portion, $\Delta L_{i,j}=D$, and the difference exceeds the threshold value T1 and the forklift F1 is likely to be determined not to face in despite of facing.

The control unit 105 approximates the insertion surface 211 to a straight line (linear approximation), and performs the facing determination on the basis of the approximated straight line. For example, the control unit 105 performs approximation of a straight line using the least squares method on the coordinates of the insertion surface 211.

In FIG. 15A, the insertion surface 211 of the container 20 is approximated to the straight line 212. On the other hand, in FIG. 15B, the insertion surface 211 of the container 20 is approximated to a straight line 213.

Thus, since the control unit 105 linearly approximates the detected insertion surface 211, the control unit 105 can appropriately determine whether or not the insertion surface 211 is facing even when all or part of the surface of the container 20 has unevenness.

Further, the control unit 105 may perform the facing determination on the basis of an average value of the plurality of differences $\Delta L_{i,j}$ in the insertion surface 211. For example, the control unit 105 may use the average value of the differences $\Delta L_{i,j}$ at adjacent or surrounding positions.

For example, the difference $\Delta L_{i,j}$ may be $\Delta L_{i,j}=|\Delta L_{i+1,j}+\Delta L_{i,j}+\Delta L_{i-1,j}|/3$. Accordingly, the control unit 105 can equalize the value of the difference $\Delta L_{i,j}$ and can prevent an erroneous determination.

Further, the control unit 105 may set the threshold value T1 and the threshold value T11 or T12 in consideration of the unevenness of the insertion surface 211. That is, the threshold value T1 and the threshold value T11 or T12 may be set to a value greater than the unevenness distance D (see FIGS. 15A and 15B).

That is, even when the insertion surface 211 has unevenness, the difference $\Delta L_{i,j}$ does not exceed the unevenness distance D unless the insertion surface 211 is inclined. Since the control unit 105 sets the threshold value T1 and the threshold value T11 or T12 to a value greater than D, it is possible to prevent a determination that the forklift does not face in despite of facing.

MODIFICATION EXAMPLE B3

Condition of Output or Facing Determination

In the above embodiment, the control unit 105 (the forklift F1 or the work management device 1) may set conditions for performing or not performing the facing determination.

The control unit 105 may perform an output (warning) based on the facing determination when the first condition to be described below is satisfied and may not perform the output based on the facing determination when the first condition is not satisfied. Further, the control unit 105 may perform the facing determination or the sensing when the first condition is satisfied and may not perform the facing determination or the sensing when the first condition is not satisfied.

Further, the control unit 105 may change an interval of the output based on the facing determination, or the facing determination or sensing (hereinafter referred to as a warning or the like) on the basis of the first condition.

The first condition is, for example, a condition that the distance between the container 20 and the forklift F1 is smaller than (in proximity to) the threshold value, as described above.

The first condition may be, for example, a condition based on the position information or the vehicle information. For example, when the forklift F1 enters a predetermined position (range) in a warehouse or the like, the control unit 105 may perform the warning or the like, and may not perform the warning or the like at other positions.

For example, the control unit 105 may perform the warning or the like when the gear is in a forward direction and may not perform the warning or the like otherwise. The control unit 105 may perform the warning or the like when the gear is in a backward direction and may not perform the warning or the like otherwise.

For example, the control unit 105 may perform the warning or the like when a vehicle speed is lower than a threshold value and may not perform the warning otherwise. On the other hand, the control unit 105 may perform the warning or the like when the vehicle speed is higher than the threshold value, and may not perform the warning or the like otherwise.

For example, the control unit 105 may perform the warning or the like when a steering angle is smaller than a threshold value and may not perform the warning or the like otherwise.

The first condition may be, for example, a condition based on fork information or work information.

For example, the control unit 105 may perform the warning or the like when there is no gripped transport target and may not perform the warning or the like when there is the gripped transport target. The control unit 105 may perform the warning or the like when a position (height) of the forks F101 and F102 is lower than a threshold value and may not perform the warning or the like when the position (height) of the forks F101 and F102 is higher than the threshold value.

For example, the control unit 105 may perform the warning or the like when a specific worker drives and may not perform the warning or the like in other cases.

The first condition may be, for example, a condition that the forks F101 and F102 are not pulled out.

For example, the control unit 105 performs the warning or the like (for example, a warning) when the forks F101 and F102 are not pulled out and does not perform the warning or the like (for example, a warning) when the forks F101 and F102 are pulled out. Further, when the gear is in a backward direction or when there is no gripped transport target (when the transport target is placed and no load is applied to the fork), the control unit 105 may determine whether or not to perform the warning or the like under this condition.

MODIFICATION EXAMPLE B4

Attachment of Work Management Device 1

In the above embodiment, the control unit 105 (the forklift F1 or the work management device 1) may perform a determination as to whether or not the work management device 1 is appropriately attached (also referred to as a "attachment determination").

Figure 16A:
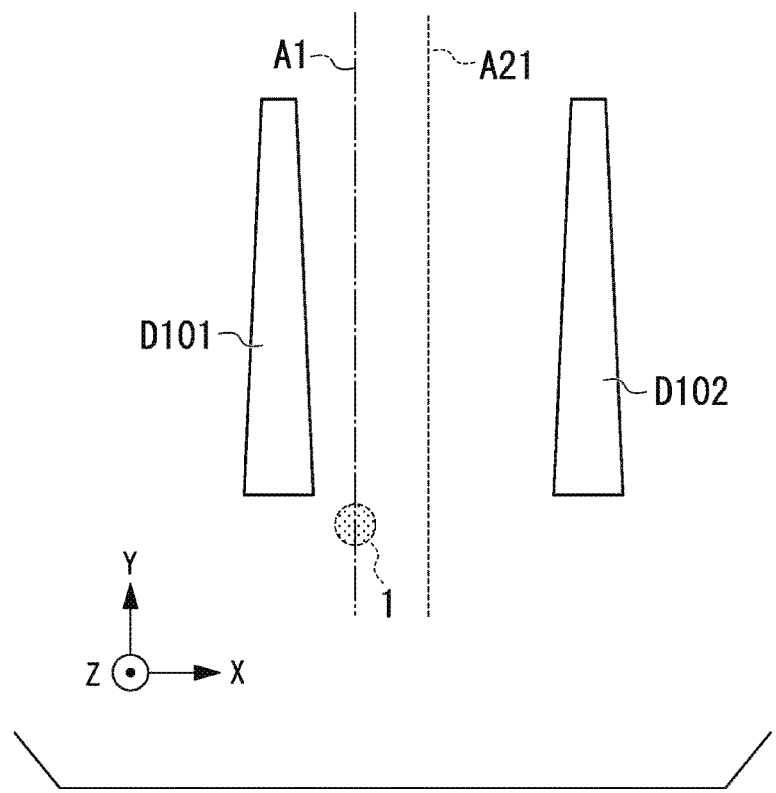
FIG. 16A is a schematic diagram illustrating another example of the detection result of the fork according to the modification example of the embodiment and is a diagram illustrating a case in which a position at which a work management device is attached is not appropriate.
Figure 16B:
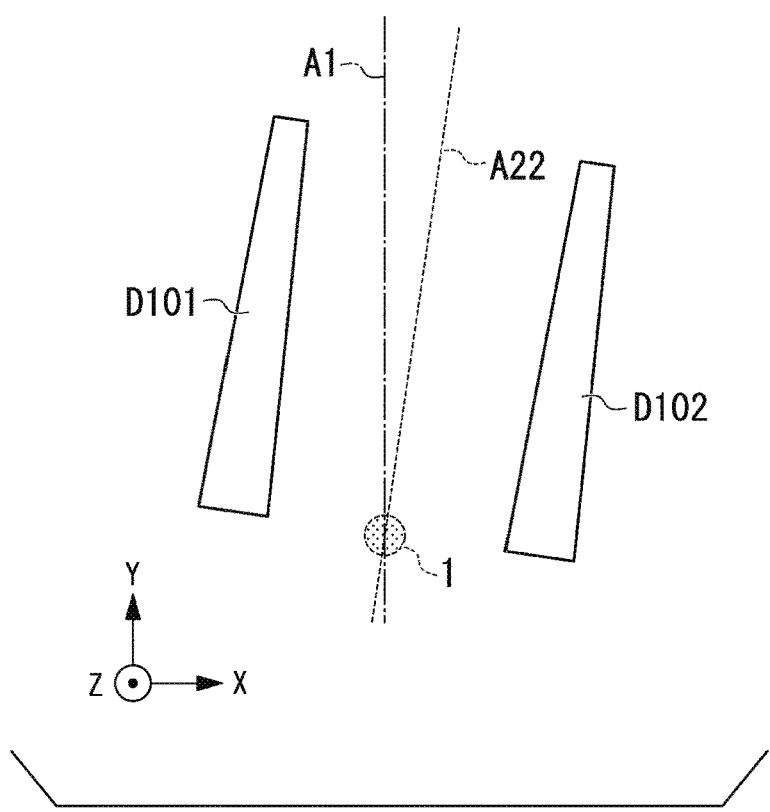
FIG. 16B is a schematic diagram illustrating another example of the detection result of the fork according to the modification example of the embodiment, and is a diagram illustrating a case in which a direction in which the work management device is attached is not appropriate.

For example, when the work management device 1 is attached to be inclined with respect to the traveling direction of the forklift F1, a determination is made that the forklift F1 does not face the container 20 when the forklift F1 faces the container 20 (see FIG. 16B).

The work management device 1 performs sensing in a state in which the fork of the forklift F1 is completely sensed, and detects the forks D101 and D102 of the forklift F1. The work management device 1 performs an attachment determination on the basis of the forks D101 and D102. Accordingly, the work management device 1 can be appropriately attached and can appropriately perform the facing determination.

FIGS. 16A and 16B are schematic diagrams illustrating another example of the detection result of the forks D101 and D102 according to a modification example of the embodiment.

FIGS. 16A and 16B illustrate a case in which the work management device 1 is not appropriately attached. It should be noted that a straight line A1 indicates an initial direction of a laser light irradiation direction (polar angle $\theta=\phi=0$: also referred to as an initial optical axis A1). Straight lines A22 and A23 indicate symmetrical axes (also referred to as a target axis A2) of the forks D101 and D102 in FIGS. 16A and 16B.

The control unit 105 performs an attachment determination as follows. The control unit 105 detects the target axis A2 of the forks D101 and D102. The control unit 105 compares the initial optical axis A with the target axis A2. The control unit 105 stores the work management device 1 (an irradiation port) as an origin of orthogonal coordinates and a Y axis as the initial optical axis A in advance.

When the initial optical axis A and the target axis A2 do not match (including a case in which the initial optical axis A and the target axis A2 are not in a predetermined range), the work management device 1 determines that the work management device 1 is not appropriately attached. On the other hand, when the initial optical axis A and the target axis A2 match each other (including a case in which the initial optical axis A and the target axis A2 are in a predetermined range), the work management device 1 determines that the work management device 1 is appropriately attached.

Specifically, when the initial optical axis A and the target axis A2 are parallel, the work management device 1 determines that the direction in which the work management device 1 is attached is appropriate and determines that the direction in which the work management device 1 is attached is not appropriate when the initial optical axis A and the target axis A2 are not parallel.

When an intersection between the initial optical axis A and the target axis A2 is at the work management device 1 (an irradiation port) (including a case in which the initial optical axis A completely matches the target axis A2), the position at which the work management device 1 is attached is determined to be appropriate. When the intersection between the initial optical axis A and the target axis A2 does not at the work management device 1 (the irradiation port), the position at which the work management device 1 is attached is determined not to be appropriate.

In FIG. 16A, a direction in which the work management device 1 is attached is appropriate, but a position in which the work management device 1 is attached is not appropriate. In this case, as illustrated in FIG. 16A, although the initial optical axis A and a target axis A21 are parallel to each other, but an intersection is shifted.

In FIG. 16B, the position at which the work management device 1 is attached is appropriate, but the direction in which the work management device 1 is attached is not appropriate. In this case, as illustrated in FIG. 16B, the initial optical axis A and a target axis A22 are not parallel to each other even though the intersection is at the work management device 1 (the irradiation port).

It should be noted that, as illustrated in FIG. 2, in a case in which the work management device 1 is fixed to a central portion of the forklift F1 in an X-axis direction, the work management device 1 can be located in a central portion of the fork F101 and the fork F102 or a central portion of the fork pocket 201 and the fork pocket 202 when the forklift F1 tries to grip the container 20 appropriately.

Further, when the work management device 1 is fixed to the fork rail F11 or the backrest F13, the work management device 1 can more easily recognize the forks F101 and F102, as compared to a case in which the work management device 1 is fixed to the fork rail F12. That is, since the work management device 1 and the forks F101 and F102 are separated in a height direction (the X-axis direction), the work management device 1 can further recognize shapes in a length direction (the Y-axis direction) of the forks F101 and F102 (see FIGS. 3 and 5).

Further, when the work management device 1 is fixed to the fork rail F11 or F12, the work management device 1 can more easily recognize the fork pockets 201 and 202, as compared to a case in which the work management device 1 is fixed to the backrest F13. That is, since the work management device 1 and the fork pockets 201 and 202 approach in the height direction, the work management device 1 can cause an irradiation angle (an angle in the height direction) of the laser light or the like to the fork pockets 201 and 202 to be further close to horizontal (perpendicular to the insertion surface).

It should be noted that the facing determination may be a determination as to whether or not the fork F101 and the fork F102 are perpendicular to the container 20 or the insertion surface 211.

Further, the spatial recognition sensor may perform spatial recognition using means other than the laser light. For example, the work management device 1 may perform spatial recognition using radio waves other than laser light or may perform the spatial recognition using a captured image, for example. Examples of the spatial recognition sensor may include a monocular camera, a stereo camera, an infrared camera, a millimeter wave radar, an optical laser, a light detection and ranging or laser imaging detection and ranging (LiDAR), and an (ultra) sonic wave sensor.

Further, the work management device 1 may be connected to an automatic driving device or may be a portion of the automatic driving device. That is, the work management device 1 may perform a loading deviation determination and may automatically drive the forklift F1 so that an amount of insertion becomes appropriate.

For example, the work management device 1 adjusts a gear, an accelerator, and a brake, for example, to cause the fork lift F1 to move forward or backward so that an insertion distance $d_p$ approaches a predetermined range as a result of the loading deviation determination.

Further, the work management device 1 may exclude the road surface G, a wall, and an object at a position farther than a predetermined distance from the detection targets (sensing information). For example, when projection onto each surface is performed, the work management device 1 excludes these from projection targets.

It should be noted that the work management device 1 may use edge detection when detecting the container 20, the loading platform L1, and the forks F101 and F102. Here, an edge detected using edge detection is, for example, the distance R or a place at which a rate of change thereof is large.

As a specific edge detection, the work management device 1 may use, as an edge, a portion in which a partial differentiation on each coordinate axis is equal to or greater than a threshold value for the detected object. Further, for example, the work management device 1 may use, as an edge, a portion in which detected planes intersect, a portion in which a difference in distance R between adjacent or close points in the reverse direction is equal to or greater than a threshold value, or a portion adjacent to a portion in which reflected light of laser light is not detected, or a portion adjacent to a portion in which a reception level of the reflected light of the laser light is low. The work management device 1 may perform edge detection using another scheme.

It should be noted that the work management device 1 may perform the above process by recording a program for realizing each function in a computer-readable recording medium, loading the program recorded on the recording medium into the computer system, and executing the program. It should be noted that the "computer system" described herein includes an OS or hardware such as a peripheral device. Further, the "computer system" also includes a WWW system including a homepage providing environment (or display environment). Further, the "computer-readable recording medium" includes a storage device such as a flexible disk, a magneto-optical disc, a read only memory (ROM), a portable medium such as a CD-ROM, or a hard disk built in the computer system. Further, the "computer-readable recording medium" also includes a recording medium that holds a program for a certain time, such as a volatile memory (RAM) inside a computer system including a server and a client when a program is transmitted over a network such as the Internet or a communication line such as a telephone line.

Further, the program may be transmitted from a computer system in which the program is stored in a storage device or the like to other computer systems via a transfer medium or by transfer waves in the transfer medium. Here, the "transfer medium" for transferring the program refers to a medium having a function of transferring information, such as a network (communication network) such as the Internet or a communication line such as a telephone line. Further, the program may be a program for realizing some of the above-described functions. Further, the program may be a program capable of realizing the above-described functions in combination with a program previously stored in the computer system, that is, a so-called differential file (differential program).

REFERENCE SYMBOLS

F1 Forklift
F101, F102 Fork
F11, F12 Fork rail
F13 Backrest
F14 Mast
20 Container
201, 202 Fork pocket
211 Insertion surface
1 Work management device
111 CPU
112 IF
113 Communication module
114 Sensor
121 ROM
122 RAM
123 HDD
101 Sensor
102 Vehicle Information acquisition unit
103 GNSS receiver
104 Analysis unit
105 Control unit
106 output unit
107 Recording unit
108 Communication unit

The invention claimed is:

1. A vehicle-mounted device comprising:
at least one memory configured to store instructions; and
at least one processor configured to execute the instruction to:
detect a pair of insertion blades based on sensing information acquired from a spatial recognition device;
compare a shape of the detected pair of insertion blades with a shape of a stored pair of insertion blades; and
perform a facing determination to determine whether or not the detected pair of insertion blades faces an insertion surface having insertion portions of an insertion target into which the detected pair of insertion blades are inserted based on whether or not a difference in an area or length between the shape of the detected pair of insertion blades and the shape of the stored pair of the insertion blades is smaller than a threshold value.

2. The vehicle-mounted device according to claim 1, wherein the at least one processor is configured to execute the instruction to perform the facing determination on the basis of whether or not the shape of the detected pair of insertion blades is line symmetrical with respect to right and left.

3. The vehicle-mounted device according to claim 1, wherein the at least one processor is configured to execute the instruction to output a warning on the basis of vehicle information indicating a steering angle of a vehicle in which the vehicle-mounted device is mounted, when the control unit determines that the detected pair of insertion blade faces the insertion surface.

4. The vehicle-mounted device according to claim 1, wherein the at least one processor is configured to execute the instruction to determine whether or not the detected pair of insertion blades is pulled out from the insertion target based on the shape of the detected pair of insertion blades.

5. The vehicle-mounted device according to claim 1, wherein the at least one processor is configured to execute the instruction to determine whether or not the spatial recognition device is appropriately attached to perform the facing determination based on the direction of the detected pair of insertion blades.

6. The vehicle-mounted device according to claim 1, wherein the at least one processor is configured to execute the instruction to perform the facing determination based on whether or not the detected pair of insertion blades are line symmetrical with respect to a predetermined axis direction when the stored pair of insertion blades are line symmetrical with respect to the predetermined axis direction.

7. A cargo handling machine comprising a vehicle-mounted device including:
at least one memory configured to store instructions; and
at least one processor configured to execute the instruction to:
detect a pair of insertion blades based on sensing information acquired from a spatial recognition device;
compare a shape of the detected pair of insertion blades with a shape of a stored pair of insertion blades; and
perform a facing determination to determine whether or not the detected pair of insertion blades faces an insertion surface having insertion portions of an insertion target into which the detected pair of insertion blades are inserted based on whether or not a difference in an area or length between the shape of the detected pair of insertion blades and the shape of the stored pair of insertion blades is smaller than a threshold value.

8. A control circuit that determines whether or not a detected pair of insertion blades faces an insertion surface having insertion portions of an insertion target into which the detected pair of insertion blades are inserted, based on whether or not a difference in an area or length between a shape of the detected pair of insertion blades and a shape of a stored pair of insertion blades is smaller than a threshold value.

9. A control method comprising:
detecting, by an analyzer, a pair of insertion blades based on sensing information acquired from a spatial recognition device;
comparing a shape of the detected pair of insertion blades with a shape of a stored pair of insertion blades; and
performing, by a controller, a facing determination to determine whether or not the detected pair of insertion blades face an insertion surface having insertion portions of an insertion target into which the detected pair of insertion blades are inserted based on whether or not a difference in an area or length between the shape of the detected pair of insertion blades and the shape of the stored pair of insertion blades is smaller than a threshold value.

10. A non-transitory computer readable medium which stores a program that when executed by a computer, causes the computer to:
detect a pair of insertion blades based on sensing information acquired from a spatial recognition device;
compare a shape of the detected pair of insertion blades with a shape of a stored pair of insertion blades; and
perform a facing determination to determine whether or not the detected pair of insertion blades face an insertion surface having insertion portions of an insertion target into which the detected pair of insertion blades are inserted based on whether or not a difference in an area or length between the shape of the detected pair of insertion blades and the shape of the stored pair of insertion blades is smaller than a threshold value.

* * * * *